US012634774B2

(12) United States Patent
Zou et al.

(10) Patent No.: US 12,634,774 B2
(45) Date of Patent: May 19, 2026

(54) TIME-SENSITIVE NETWORK (TSN) DISTRIBUTION INFORMATION DURING HANDOVER

(71) Applicant: Telefonaktiebolaget LM Ericsson (publ), Stockholm (SE)

(72) Inventors: Zhenhua Zou, Solna (SE); Nianshan Shi, Järfälla (SE); Torsten Dudda, Wassenberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 318 days.

(21) Appl. No.: 18/261,550

(22) PCT Filed: Dec. 17, 2021

(86) PCT No.: PCT/EP2021/086500
§ 371 (c)(1),
(2) Date: Jul. 14, 2023

(87) PCT Pub. No.: WO2022/152503
PCT Pub. Date: Jul. 21, 2022

(65) Prior Publication Data
US 2024/0089813 A1     Mar. 14, 2024

Related U.S. Application Data

(60) Provisional application No. 63/137,218, filed on Jan. 14, 2021.

(51) Int. Cl.
*H04W 36/00*         (2009.01)
*H04W 56/00*         (2009.01)
*H04W 92/20*         (2009.01)
(52) U.S. Cl.
CPC ... *H04W 36/0072* (2013.01); *H04W 36/0007* (2018.08); *H04W 36/0055* (2013.01);
(Continued)

(58) Field of Classification Search
None
See application file for complete search history.

(56) References Cited

U.S. PATENT DOCUMENTS

| 2018/0263074 A1* | 9/2018 | Wang | ................ H04W 36/0007 |
| 2020/0259896 A1* | 8/2020 | Sachs | ...................... H04L 67/12 |

(Continued)

FOREIGN PATENT DOCUMENTS

| EP | 3552427 B1 | 9/2020 | |
| WO | WO-2015113286 A1 * | 8/2015 | ............ H04W 56/00 |

(Continued)

OTHER PUBLICATIONS

International Search Report and Written Opinion dated Mar. 30, 2022 for International Application No. PCT/EP2021/086500 filed Dec. 17, 2021, consisting of 14-pages.

(Continued)

*Primary Examiner* — Jay L Vogel
(74) *Attorney, Agent, or Firm* — Weisberg I.P. Law, P.A.

(57) ABSTRACT

Embodiments include methods performed by a source node for handover of a user equipment (UE) from a source cell served by the source node in a wireless network. Such methods include transmitting, in the source cell according to a reference time delivery configuration, one or more messages that include respective reference times in relation to corresponding source cell transmission events. Such methods also include transmitting, to a target node in the wireless network, the reference time delivery configuration in relation to a request to handover the UE from the source cell to a target cell served by the target node. Other embodiments include complementary methods performed by the target node, as well as network nodes configured to perform such methods.

20 Claims, 13 Drawing Sheets

Transmitting, in the source cell according to a reference time delivery configuration, one or more messages that include respective reference times in relation to corresponding source cell transmission events. — 1010

Transmitting, to a target node, the reference time delivery configuration in relation to a request to handover the UE from the source cell to a target cell served by the target node. — 1020

Receiving, from the target node, an indication of compliance with the reference time delivery configuration for the UE in the target cell. — 1030

Transmitting the reference time delivery configuration to one or more further target nodes serving respective further target cells prepared for handover of the UE from the source cell. — 1040

Receiving, from the further target nodes, respective indications of compliance with the reference time delivery configuration for the UE in the respective further target cells. — 1050

Selecting the target cell for handover of the UE from the source cell, based on the received indications of compliance with the reference time delivery configuration in the target cell and the further target cells. — 1060

(52) U.S. Cl.
CPC .............. *H04W 36/008355* (2023.05); *H04W 56/0015* (2013.01); *H04W 56/004* (2013.01); *H04W 92/20* (2013.01)

(56) References Cited

U.S. PATENT DOCUMENTS

| | | | | |
|---|---|---|---|---|
| 2022/0256408 A1* | 8/2022 | Fu | .......................... | H04W 36/08 |
| 2022/0279393 A1* | 9/2022 | Di Girolamo | ........ | H04W 72/02 |
| 2022/0338143 A1* | 10/2022 | Fu | ..................... | H04W 36/0072 |

FOREIGN PATENT DOCUMENTS

| | | | | | |
|---|---|---|---|---|---|
| WO | 2021081818 A1 | 5/2021 | | | |
| WO | 2021207966 A1 | 10/2021 | | | |
| WO | 2022023556 A1 | 2/2022 | | | |
| WO | WO-2022083574 A1 * | 4/2022 | ......... | H04W 56/005 | |

OTHER PUBLICATIONS

3GPP TR 38.825 V16.0.0; 3rd Generation Partnership Project; Technical Specification Group Radio Access Network; Study on NR Industrial Internet of Things (IoT); (Release 16); Mar. 2019, consisting of 33-pages.

3GPP TS 23.501 V16.4.0; 3rd Generation Partnership Project; Technical Specification Group Services and System Aspects; System architecture for the 5G System (5GS); Stage 2; (Release 16); Mar. 2020, consisting of 430-pages.

3GPP TS 38.331 V16.1.0; 3rd Generation Partnership Project; Technical Specification Group Radio Access Network; NR; Radio Resource Control (RRC) protocol specification (Release 16); Jul. 2020, consisting of 906-pages.

3GPP TSG-RAN WG3 Meeting #114e R3-215923; Title: Enhancements for support of time synchronization; Source to WG: Ericsson; Source to TSG: RAN3; Work Item Code: NR_IIOT_URLLC_enh-Core; Date and Location: Nov. 1-12, 2021, Online, consisting of 19-pages.

* cited by examiner

UPF: User Plane Function
NRF: Network Repository Function
AMF: Access Management Function
SMF: Session Management Function
NEF: Network Exposure Function
PCF: Policy Control Function
UDM: Unified Data Management

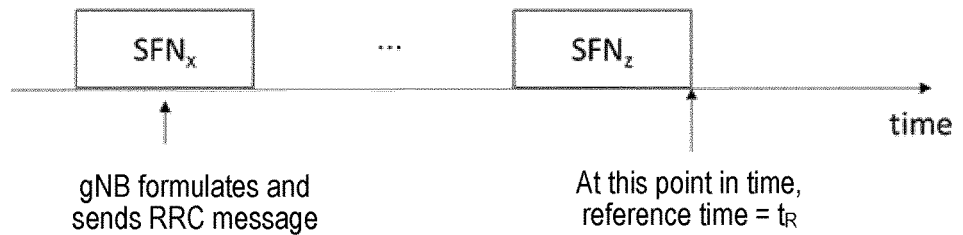

gNB formulates and
sends RRC message

At this point in time,
reference time = $t_R$

FIG. 6

```
ReferenceTimeInfo-r16 ::= SEQUENCE {
    time-r16                  ReferenceTime-r16,
    uncertainty-r16           INTEGER (0..32767)        OPTIONAL,
    timeInfoType-r16          ENUMERATED {localClock}   OPTIONAL,
    referenceSFN-r16          INTEGER (0..1023)         OPTIONAL    -- Cond RefTime
}

ReferenceTime-r16 ::=     SEQUENCE {
    refDays-r16               INTEGER (0..72999),
    refSeconds-r16            INTEGER (0..86399),
    refMilliSeconds-r16       INTEGER (0..999),
    refTenNanoSeconds-r16     INTEGER (0..99999)
}
```

FIG. 7

```
UEAssistanceInformation-v16xy-IEs ::= SEQUENCE {
    idc-Assistance-r16                  IDC-Assistance-r16                        OPTIONAL,
    drx-Preference-r16                  DRX-Preference-r16                        OPTIONAL,
    maxBW-Preference-r16                MaxBW-Preference-r16                      OPTIONAL,
    maxCC-Preference-r16                MaxCC-Preference-r16                      OPTIONAL,
    maxMIMO-LayerPreference-r16         MaxMIMO-LayerPreference-r16              OPTIONAL,
    minSchedulingOffsetPreference-r16   MinSchedulingOffsetPreference-r16        OPTIONAL,
    releasePreference-r16               ReleasePreference-r16                    OPTIONAL,
    sl-UE-AssistanceInformationNR-r16   SL-UE-AssistanceInformationNR-r16        OPTIONAL,
    referenceTimeInfoPreference-r16     BOOLEAN                                   OPTIONAL,
    nonCriticalExtension                SEQUENCE {}                               OPTIONAL
}
```

FIG. 8

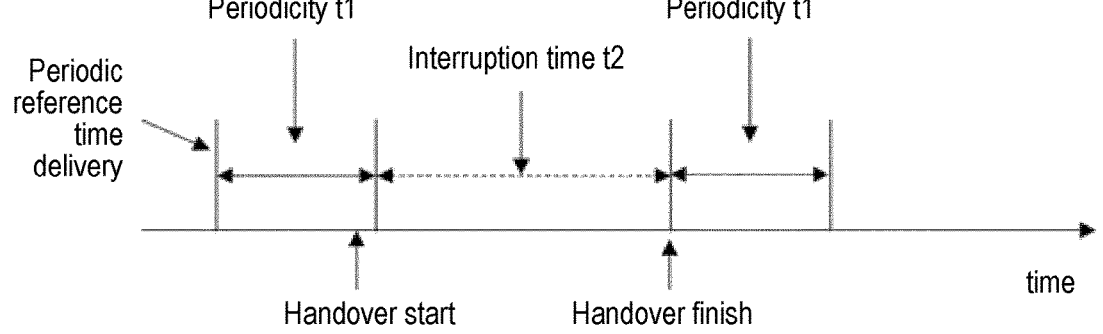

Periodicity t1

Periodicity t1

Interruption time t2

Periodic
reference
time
delivery

Handover start

Handover finish time

FIG. 9

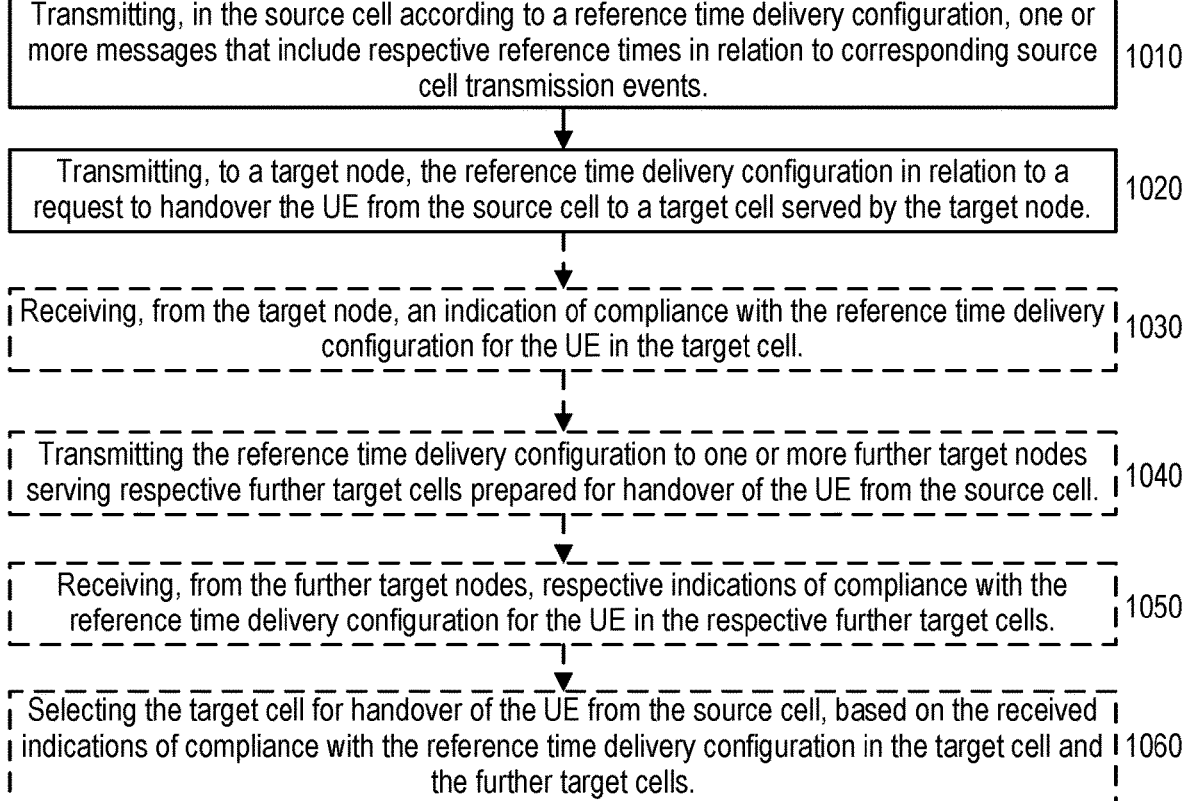

Transmitting, in the source cell according to a reference time delivery configuration, one or more messages that include respective reference times in relation to corresponding source cell transmission events.

1010

Transmitting, to a target node, the reference time delivery configuration in relation to a request to handover the UE from the source cell to a target cell served by the target node.

1020

Receiving, from the target node, an indication of compliance with the reference time delivery configuration for the UE in the target cell.

1030

Transmitting the reference time delivery configuration to one or more further target nodes serving respective further target cells prepared for handover of the UE from the source cell.

1040

Receiving, from the further target nodes, respective indications of compliance with the reference time delivery configuration for the UE in the respective further target cells.

1050

Selecting the target cell for handover of the UE from the source cell, based on the received indications of compliance with the reference time delivery configuration in the target cell and the further target cells.

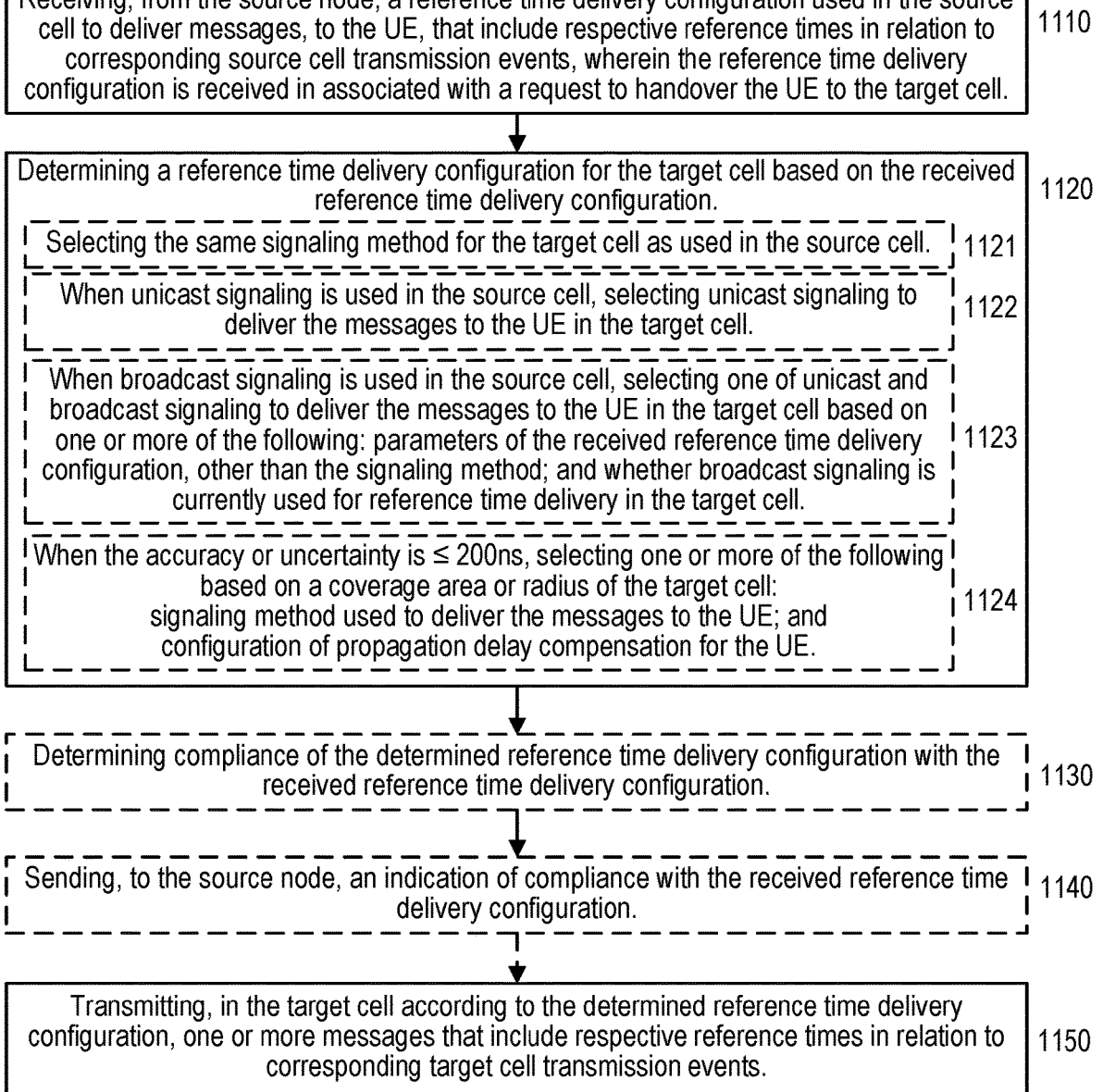

Receiving, from the source node, a reference time delivery configuration used in the source cell to deliver messages, to the UE, that include respective reference times in relation to corresponding source cell transmission events, wherein the reference time delivery configuration is received in associated with a request to handover the UE to the target cell.   1110

Determining a reference time delivery configuration for the target cell based on the received reference time delivery configuration.   1120

Selecting the same signaling method for the target cell as used in the source cell.   1121

When unicast signaling is used in the source cell, selecting unicast signaling to deliver the messages to the UE in the target cell.   1122

When broadcast signaling is used in the source cell, selecting one of unicast and broadcast signaling to deliver the messages to the UE in the target cell based on one or more of the following: parameters of the received reference time delivery configuration, other than the signaling method; and whether broadcast signaling is currently used for reference time delivery in the target cell.   1123

When the accuracy or uncertainty is ≤ 200ns, selecting one or more of the following based on a coverage area or radius of the target cell: signaling method used to deliver the messages to the UE; and configuration of propagation delay compensation for the UE.   1124

Determining compliance of the determined reference time delivery configuration with the received reference time delivery configuration.   1130

Sending, to the source node, an indication of compliance with the received reference time delivery configuration.   1140

Transmitting, in the target cell according to the determined reference time delivery configuration, one or more messages that include respective reference times in relation to corresponding target cell transmission events.   1150

*FIG. 11*

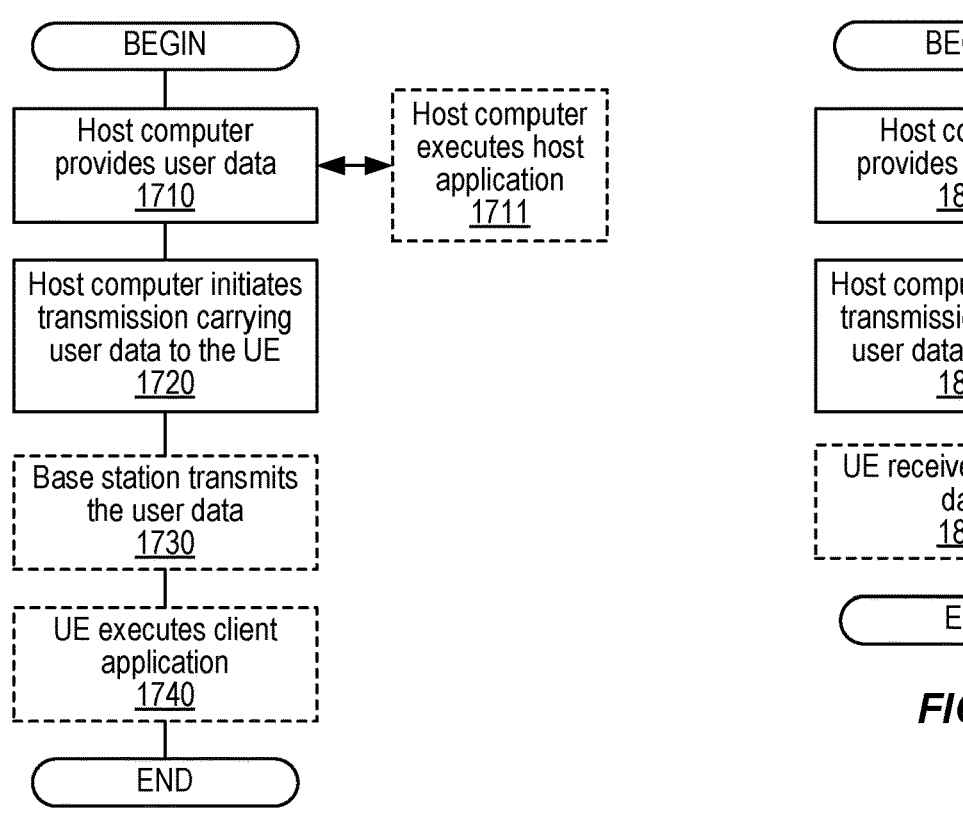
FIG. 17
FIG. 18
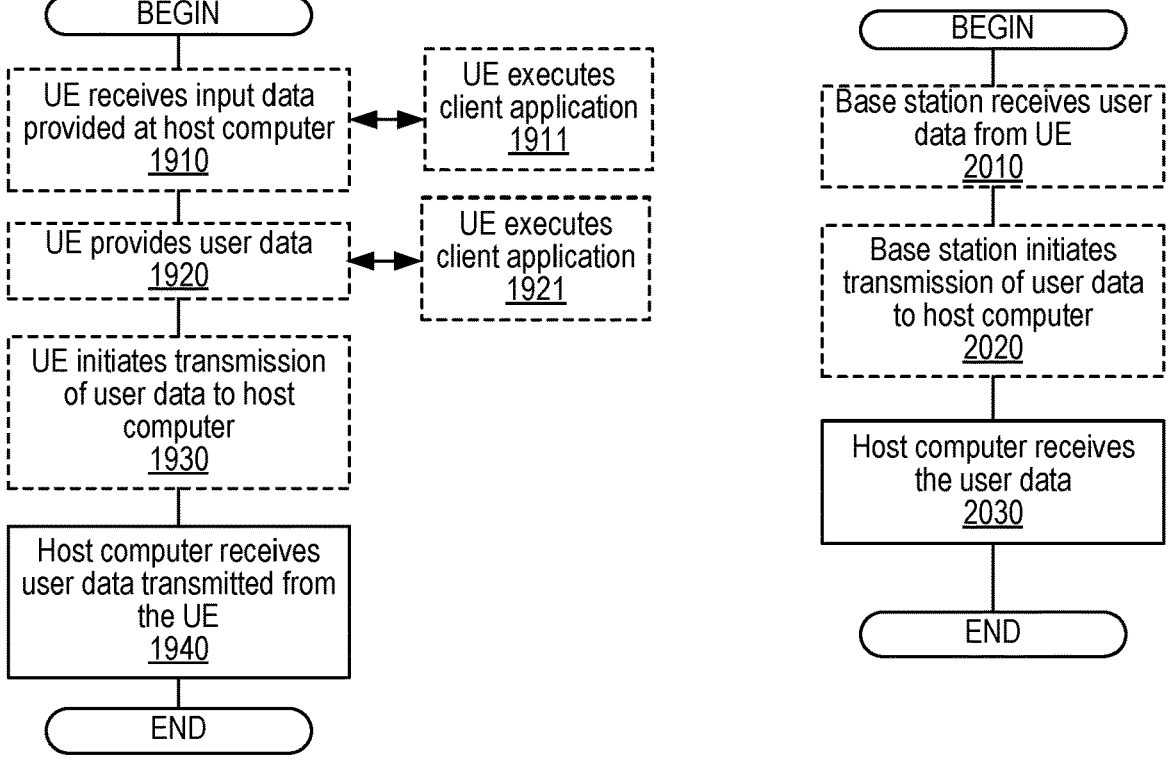
FIG. 19
FIG. 20

TIME-SENSITIVE NETWORK (TSN) DISTRIBUTION INFORMATION DURING HANDOVER

CROSS-REFERENCE TO RELATED APPLICATIONS

This application is a Submission Under 35 U.S.C. § 371 for U.S. National Stage Patent Application of International Application No.: PCT/EP2021/086500, filed Dec. 17, 2021 entitled "TIME-SENSITIVE NETWORK (TSN) DISTRIBUTION INFORMATION DURING HANDOVER," which claims priority to U.S. Provisional Application No. 63/137,218, filed Jan. 14, 2021, entitled "TIME-SENSITIVE NETWORK (TSN) DISTRIBUTION INFORMATION DURING HANDOVER," the entireties of both of which are incorporated herein by reference.

TECHNICAL FIELD

The present disclosure relates generally to the field of wireless networks and more specifically to handover of a wireless device between cells of a wireless network, particularly when the wireless network provides highly accurate timing information to the wireless device.

BACKGROUND

Industry 4.0 is a term used to refer to a current trend of automation and data exchange in manufacturing. It can include concepts and/or technologies such as cyber-physical systems, the Internet of things (IoT), cloud computing, and cognitive computing. Industry 4.0 is also referred to as the fourth industrial revolution or "I4.0" for short.

One scenario or use case for Industry 4.0 is the so-called "smart factory". Within modular structured smart factories, cyber-physical systems monitor physical processes, create a virtual copy of the physical world, and make decentralized decisions. Over the Internet of Things (IoT), cyber-physical systems communicate and cooperate with each other, and with humans, in real-time both internally and across organizational services offered and used by participants of a value chain of which the smart factory is a part. Such smart factory environment environments are also referred to as Industrial Internet of Things (IIoT).

There are four common principles associated with Industry 4.0. First, "interoperability" requires the ability to connect machines, devices, sensors, and people to communicate with each other via the IoT or, alternatively, the "Internet of People" (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These principles associated with Industry 4.0 support various use cases that place many requirements on a network infrastructure. Simpler use cases include plant measurement while more complex use cases include precise motion control in a robotized factory cell. To address these requirements, the IEEE 802.1 working group (particularly, task group TSN) has developed a Time Sensitive Networking (TSN) standard. TSN is based on the IEEE 802.3 Ethernet standard, a wired communication standard that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);

Bounded Low Latency (e.g., IEEE 802.1Qav, IEEE 802.1Qbu, IEEE 802.1Qbv, IEEE 802.1Qch, IEEE 802.1Qcr);

Ultra-Reliability (e.g., IEEE 802.1CB, IEEE 802.1Qca, IEEE 802.1Qci);

Network Configuration and Management (e.g., IEEE 802.1Qat, IEEE 802.1Qcc, IEEE 802.1Qcp, IEEE 802.1CS).

FIGS. 1-2 are block diagrams that respectively illustrate Centralized and Fully Centralized TSN configuration models, as specified in IEEE Std. 802.1Qbv-2015. Within a TSN network, the communication endpoints are called "Talker" and "Listener." All the switches and/or bridges between a Talker and a Listener must support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. A Talker initializes a stream towards a Listener, and the TSN configuration and management features are used to set up the stream and to guarantee the stream's requirements across the network. Some TSN features require a central management entity called Centralized Network Configuration (CNC), as shown in FIG. 1. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets must arrive at a switch ingress port before the gate is scheduled to be open.

The fully centralized model shown in FIG. 2 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-reliable low-latency communications (URLLC), device-to-device (D2D), etc. The achievable latency and reliability performance of NR are important for these and other use cases related to IIoT and/or Industry 4.0. In order to extend NR applicability for such use cases, support for time synchronization in the 5G system via time sensitive network (TSN) has been defined in 3GPP TS 23.501 (v16.4.0).

At a high level, the 5G network architecture consists of a Next Generation radio access network (NG-RAN) and a 5G core network (5GC). The NG-RAN includes various gNodeB's (gNBs, also referred to as base stations) serving cells by which wireless devices (also referred to as user equipment, or UEs) communicate. The gNBs can be connected to the 5GC via one or more NG interfaces and to each other via Xn interfaces. Each of the gNBs can support frequency division duplexing (FDD), time division duplexing (TDD), or a combination thereof.

FIG. 3 is a block diagram illustrating an exemplary division of the 5G network architecture into control plane (CP) and data (or user) plane (UP) functionality. For example, a UE (310) can communicate data packets to a device and/or application on an external network (e.g., the Internet) by sending them via the UE's serving gNB (321) in the NG-RAN (320) to a user plane function (UPF) in the 5GC. The UPF provides an interface between the 5GC and external networks.

CP functionality can operate cooperatively with the UP functionality. CP functions shown in FIG. 3 include an access management function (AMF), a session management function (SMF), a network exposure function (NEF), a policy control function (PCF), a network repository function (NRF), and a unified data management (UDM) function. The AMF can communicate with the RAN via an N2 logical interface, which can be carried over the NG interface from the gNB to the 5GC. Similarly, the UPF can communicate with the SMF via the N4 logical interface.

To support IIoT uses cases, a 5G network (e.g., NG-RAN and 5GC) should be capable of delivering highly accurate timing information from an external TSN network to TSN endpoints connected to the 5G network, e.g., via UEs. FIG. 4 is a block diagram illustrating an exemplary arrangement for interworking between the 5G network architecture shown in FIG. 3 and an exemplary fully centralized TSN network architecture. Reference numbers used in FIG. 4 have the same meaning as in FIG. 3. In the following discussion, a device connected to the 5G network is referred to as 5G endpoint, and a device connected to the TSN domain is referred to as TSN endpoint. The arrangement shown in FIG. 4 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

The TSN can include a grandmaster clock (TSN GM) that serves as the definitive timing source for TSN endpoints. At a high level, the 5G network in FIG. 4 should appear to the connected TSN as a switch or bridge that delivers the TSN GM timing to the connected endpoints in compliance with the requirements in IEEE 802.1AS. However, the 5G network does not use the TSN GM as its own timing source, but instead relies on a 5G system clock (5GSC) that is distributed among the various network nodes or functions. As such, one or more timing relationships between TSN GM and 5GSC may need to be determined and/or derived to facilitate transit of the TSN GSM to the connected end station in a compliant manner.

At a high level, the time synchronization solution defined in 3GPP TS 23.501 only requires NG-RAN nodes (e.g., gNBs) to be synchronized to the 5G network reference time (i.e., based on 5GSC) while TSN GM timing is delivered to UEs and endpoints transparently through the 5G network using higher-layer generalized precision time protocol (gPTP) signaling. For 5GSC synchronization, a UE relies on its serving gNB providing reference time periodically, either via broadcast or unicast signaling. The nominal periodicity $T_n$ of gNB reference time delivery is left to network implementation. However, $T_n$ can reflect the UE clock stability and gNB clock stability in relation to the 5G GM clock used as the basis of the 5G reference time, etc.

Reference time delivery from a gNB to a UE can be by unicast message or broadcast message. Broadcast delivery also has a periodicity, i.e., the reference time is broadcast every X seconds. For unicast delivery, it is left to gNB implementation whether to provide a single or periodic transmission of the reference time to a UE. The implementation choice can depend on gNB intended cell coverage range and UE synchronization requirements.

SUMMARY

Thus, it is possible that a particular gNB does not support all reference time delivery mechanisms, which can cause various problems, issues, and/or difficulties when UEs requiring synchronization are handed over between cells served by different gNBs. For example, a UE may not be able to meet its synchronization performance requirement during handover between gNBs supporting different reference time delivery mechanisms.

Embodiments of the present disclosure provide specific improvements to time-sensitive networking (TSN) in a wireless environment, such as by facilitating solutions to overcome the exemplary problems summarized above and described in more detail below.

Embodiments include various methods (e.g., procedures) for handover of a user equipment (UE) from a source cell served by a source node in a wireless network. These exemplary methods can be performed by a network node (e.g., base station, eNB, gNB, ng-eNB, etc.) acting as the UE's source node in the wireless network.

These exemplary methods can include transmitting, in the source cell according to a reference time delivery configuration, one or more messages that include respective reference times in relation to corresponding source cell transmission events. These exemplary methods can also include transmitting, to the target node, the reference time delivery configuration (i.e., used in source cell) in relation to a request to handover the UE from the source cell to a target cell served by the target node.

In some embodiments, the reference time delivery configuration can include one or more of the following:
  signaling method used to deliver the messages;
  delivery periodicity;
  accuracy or uncertainty of the delivered reference times;
  indication of whether propagation delay compensation is
      included in the delivered reference times; and
  configuration of propagation delay compensation.

In some of these embodiments, the signaling method can be one of broadcast signaling and unicast signaling. In some of these embodiments, the accuracy or uncertainty is also included in the messages with the respective reference times. In some of these embodiments, the delivery periodicity can be one of an enumerated set of values that includes non-periodic or one-shot delivery.

In some of these embodiments, the configuration of propagation delay compensation can include one or more of the following: propagation delay compensation method, most recent propagation delay compensation, estimated propagation delay in the source cell, estimated distance between source node and UE, source node position, estimated UE speed, and update time for propagation delay compensation.

In some embodiments, the reference time delivery configuration is transmitted together with the request to handover the UE to the target cell. In other embodiments, the reference time delivery configuration is transmitted before the request to handover the UE to the target cell. In such case, these exemplary methods can also include receiving, from the target node, an indication of compliance with the reference time delivery configuration for the UE in the target cell.

In some of these embodiments, these exemplary methods can also include the following operations: transmitting the reference time delivery configuration to one or more further target nodes that serve respective further target cells prepared for handover of the UE from the source cell; receiving, from the further target nodes, respective indications of compliance with the reference time delivery configuration for the UE in the respective further target cells; and selecting the target cell for handover of the UE from the source cell, based on the received indications of compliance with the reference time delivery configuration in the target cell and the further target to cells.

Other embodiments include methods (e.g., procedures) for handover of a UE to a target cell served by a target node in a wireless network. These exemplary methods can be performed by a network node (e.g., base station, eNB, gNB, ng-eNB, etc.) acting as the UE's target node in the wireless network.

These exemplary methods can include receiving, from a source node in the wireless network, a reference time delivery configuration used in a source cell to deliver messages, to the UE, that include respective reference times in relation to corresponding source cell transmission events. The reference time delivery configuration is received in relation to a request to handover the UE to the target cell. These exemplary methods can also include determining a reference time delivery configuration for the target cell based on the received reference time delivery configuration. These exemplary methods can also include transmitting, in the target cell according to the determined reference time delivery configuration, one or more messages that include respective reference times in relation to corresponding target cell transmission events. In some embodiments, the one or more messages can be transmitted in the target cell after completion of the requested handover of the UE to the target cell.

In some embodiments, the received reference time delivery configuration (i.e., used in the source cell) can include one or more of the following:
  signaling method used to deliver the messages;
  delivery periodicity;
  accuracy or uncertainty of the reference times delivered by the source node;
  indication of whether propagation delay compensation is included in the delivered reference times delivered by the source node; and
  configuration of propagation delay compensation.
  In some embodiments, the signaling method can be one of broadcast signaling and unicast signaling. In some embodiments, the determining operations can include selecting the same signaling method for the target cell as used in the source cell.

In other embodiments, the determining operations can include the following: when unicast signaling is used in the source cell, selecting unicast signaling to deliver the messages to the UE in the target cell; and when broadcast signaling is used in the source cell, selecting either unicast signaling or broadcast signaling to deliver the messages to the UE in the target cell, based on one or more of the following:
  parameters of the received reference time delivery configuration, other than the signaling method; and
  whether broadcast signaling is currently used for reference time delivery in the target cell.
  In some embodiments, the accuracy or uncertainty is also included in the messages with the respective reference times. In some embodiments, the determining operations can include, when the accuracy or uncertainty is less than or equal to 200 ns, selecting one or more of the following based on a coverage area or radius of the target cell: signaling method used to deliver the messages to the UE, and configuration of propagation delay compensation for the UE.

In some embodiments, the delivery periodicity can be one of an enumerated set of values that includes non-periodic or one-shot delivery. In some embodiments, the configuration of propagation delay compensation can include one or more of the following: propagation delay compensation method, most recent propagation delay compensation, estimated propagation delay in the source cell, estimated distance between source node and UE, source node position, estimated UE speed, and update time for propagation delay compensation.

In some embodiments, the reference time delivery configuration is received together with the request to handover the UE to the target cell. In other embodiments, the reference time delivery configuration is received before the request to handover the UE to the target cell. In these embodiments, these exemplary methods can also include determining compliance of the determined reference time delivery configuration with the received reference time delivery configuration and sending, to the source node, an indication of compliance with the received reference time delivery configuration.

Other embodiments include network nodes (e.g., base station, eNB, gNB, ng-eNB, etc. or components thereof) configured to perform operations corresponding to any of the exemplary methods described herein. Other embodiments include non-transitory, computer-readable media storing program instructions that, when executed by processing circuitry of network nodes, configure the network nodes to perform operations corresponding to any of the exemplary methods described herein.

These and other embodiments can facilitate reference time delivery during UE handover, thereby allowing UEs to meet their respective synchronization performance requirements during and/or after handover. Furthermore, embodiments can facilitate pre-handover selection of a preferred target cell for a UE, based on whether target nodes associated with respective target cells can fulfill the UE's synchronization performance requirements during and/or after handover. At a high level, embodiments facilitate improved synchronization of mobile UEs to a TSN.

These and other objects, features, and advantages of embodiments of the present disclosure will become apparent upon reading the following Detailed Description in view of the Drawings briefly summarized below.

BRIEF DESCRIPTION OF THE DRAWINGS

FIG. 6 illustrates an exemplary reference time update procedure between a UE and a serving node (e.g., gNB).

FIG. 7 shows an ASN.1 data structure for an exemplary Refer enceTimeInfo information element (IE) used to provide reference time to a UE.

FIG. 8 shows an ASN.1 data structure for a UEAssistanceInformation message by which a UE can indicate preference(s) for receiving reference time information.

FIG. 9 illustrates an exemplary scenario of interruption due to UE handover.

FIG. 10 is a flow diagram illustrating an exemplary method (e.g., procedure) performed by a source node for handover of a UE in a wireless network, according to various embodiments of the present disclosure.

FIG. 11 shows a flow diagram illustrating an exemplary method (e.g., procedure) performed by a target node for handover of a UE in a wireless network, according to various embodiments of the present disclosure.

FIGS. 17-20 are flow diagrams illustrating exemplary methods (e.g., procedures) implemented in a communication system, according to various embodiments of the present disclosure.

DETAILED DESCRIPTION

Figure 1:
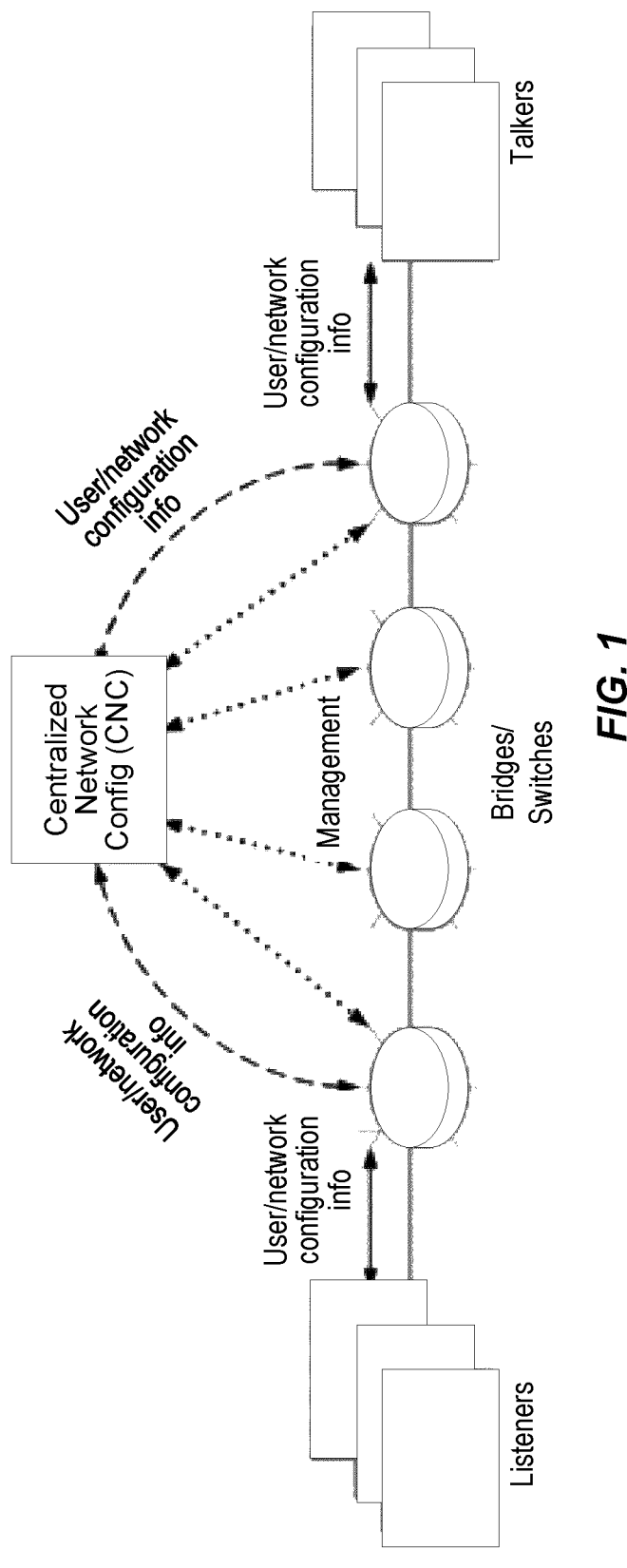
FIG. 1 is a block diagram illustrating a Centralized TSN configuration model, as specified in IEEE 802.1Qbv-2015.
Figure 2:
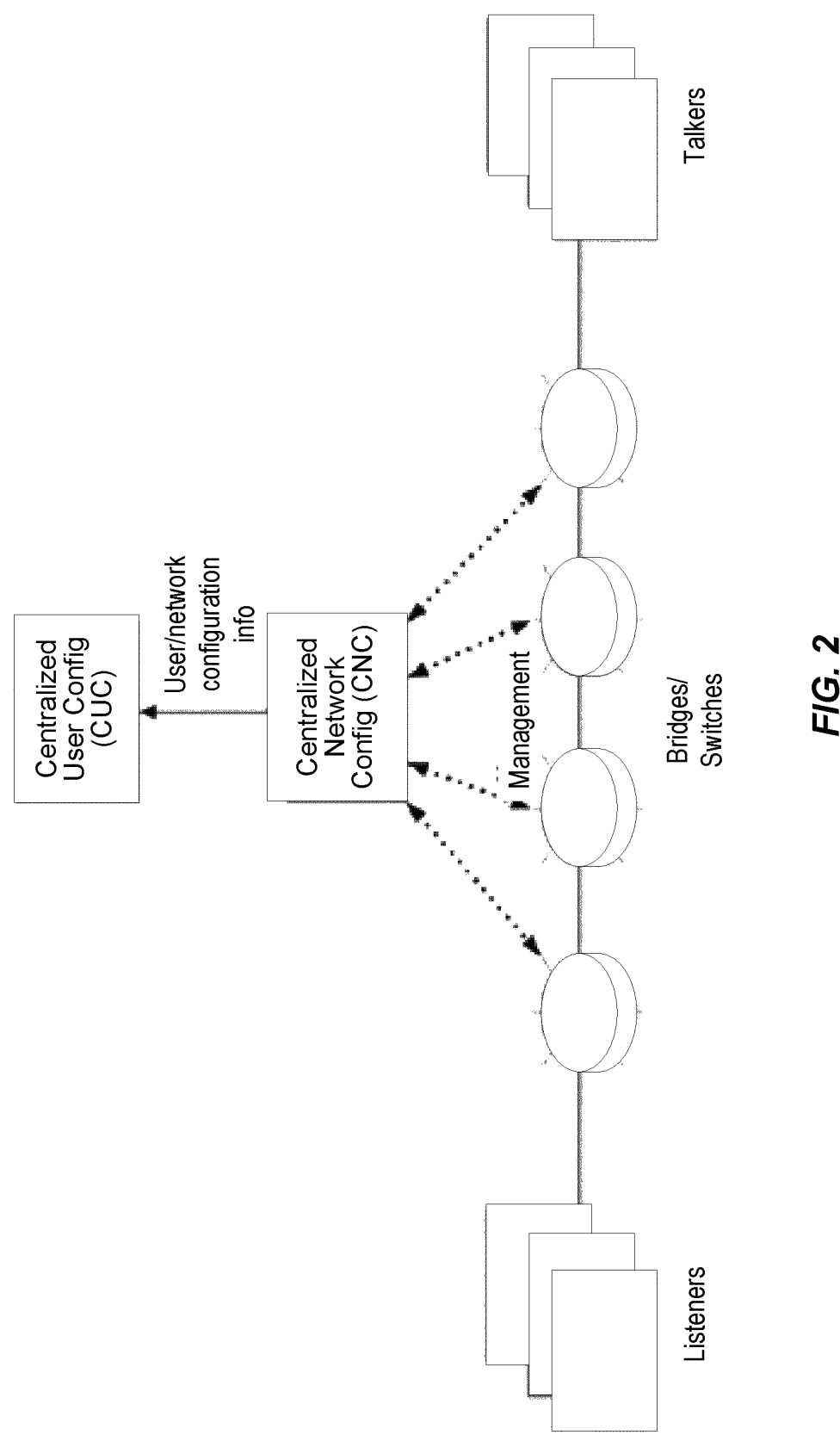
FIG. 2 is a block diagram illustrating a Fully Centralized TSN configuration model, as specified in IEEE 802.1Qbv-2015.
Figures 3, 4:
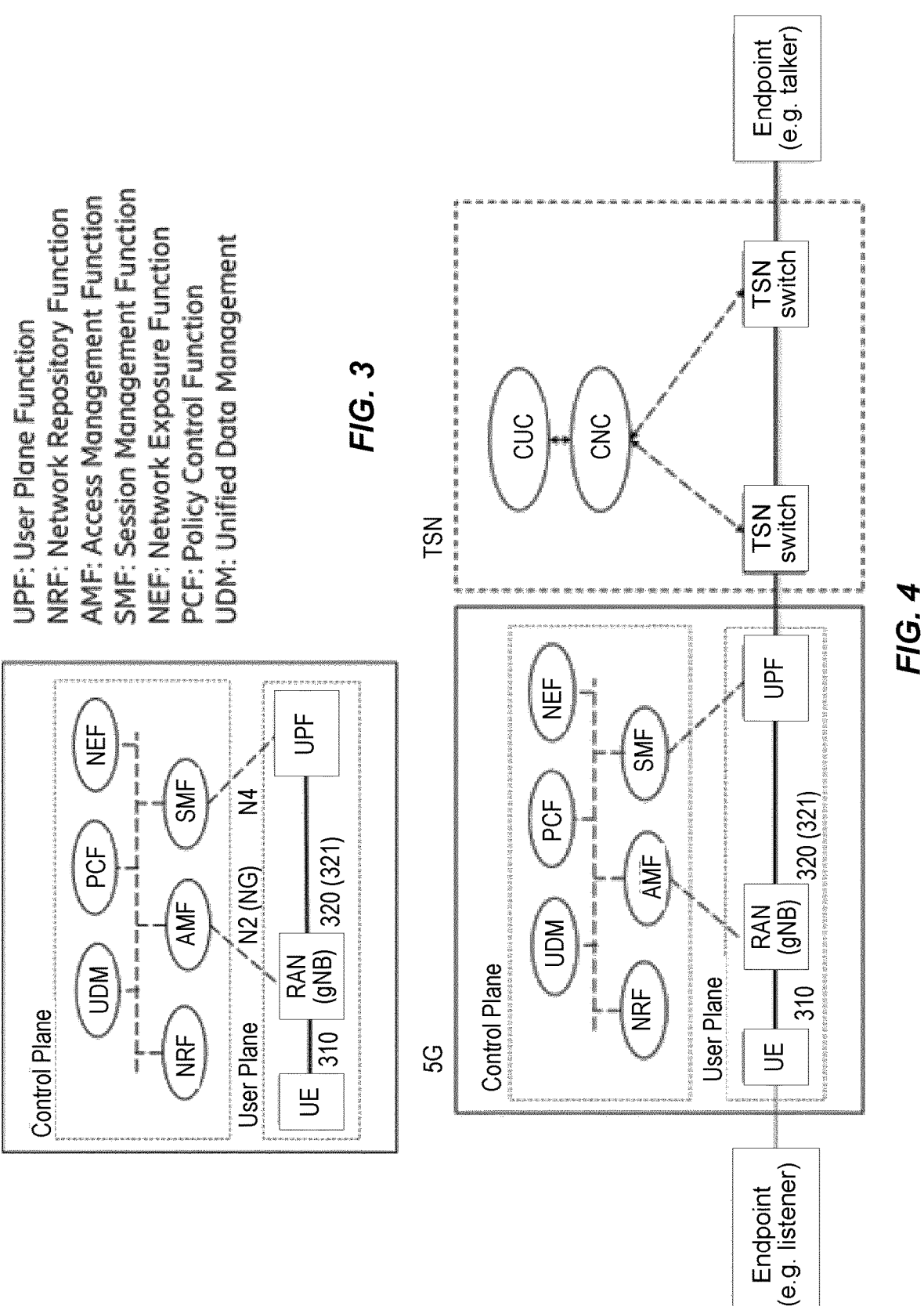
FIG. 3 is a block diagram illustrating an exemplary control plane (CP) and user plane (UP) architecture of an exemplary 5G wireless network.
FIG. 4 is a block diagram illustrating an exemplary arrangement for interworking between the 5G network architecture shown in FIG. 3 and an exemplary fully centralized TSN network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 5:
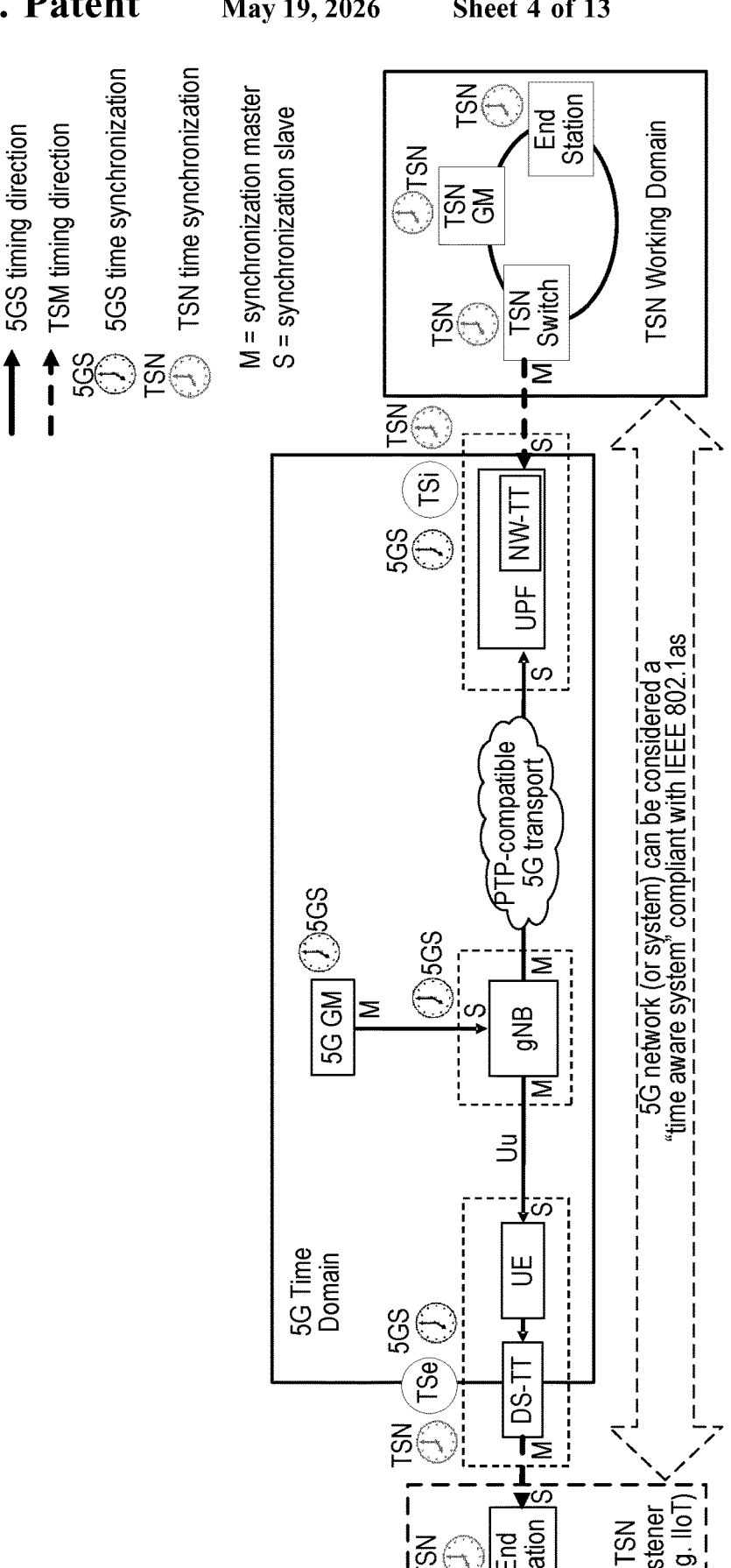
FIG. 5 is a high-level block diagram of an exemplary arrangement in which a 5G network delivers timing references from a TSN to TSN end stations connected to the 5G network, according to various embodiments of the present disclosure.

FIG. 5 is a high-level block diagram of an exemplary arrangement in which a 5G network delivers timing references from a TSN network to TSN end stations connected to the 5G network. The TSN source network is shown as a TSN Working Domain that includes a TSN GM, an end station, and a TSN Switch. In this exemplary arrangement, the 5G network is integrated with the external TSN network as a TSN bridge, such as shown in other figures described above. Furthermore, in this arrangement, the 5G network can be modelled as an IEEE 802.1AS compliant entity; for TSN synchronization, the end-to-end 5G network can be considered as an IEEE 802.1AS "time-aware system".

However, only the TSN Translators (TTs) at the edges of the 5G network need to support the IEEE 802.1AS operations. This includes a network side TSN translator (NW-TT) at the user plane function (UPF) and a device-side TSN translator (DS-TT) at the UE. Ingress timestamping ("TSi") is performed by the NW-TT when an external TSN clock (e.g., timing) signal is received by from the TSN Working Domain. Likewise, egress timestamping ("TSe") is performed by the DS-TT when that TSN clock signal arrives at a UE. In addition to ingress and egress timestamping, the TTs can support other 802.1AS functions such as generalized precision time protocol (gPTP), Best Master Clock Algorithm (BMCA), rateRatio, etc.

More specifically, upon reception of a downlink gPTP message, the NW-TT makes an ingress timestamp (TSi) for each gPTP event (Sync) message. The UPF then forwards the gPTP message from TSN network to the UEs via all UPF-terminated PDU sessions that the UEs have established to the TSN network. All gPTP messages are transmitted on a quality of service (QoS) flow that complies with the residence time upper bound requirement specified in IEEE 802.1AS. The UE receives the gPTP messages and forwards them to the DS-TT. The DS-TT then makes an egress timestamp (TSe) for the gPTP event (Sync) messages for the TSN domain (e.g., the endpoints).

The difference between TSi and TSe reflects the residence time of the gPTP message within the 5G network, expressed in 5GSC time. Put differently, if gPTP message indicating TSN time "X" is stamped with 5G system clock (5GSC) time "Y" at ingress and 5GSC time "Z" at egress, the end stations can adjust TSN time "X" delivered to the end station by the residence time Z-Y. More specifically, the DS-TT calculates and adds the measured residence time between the TTs into the Correction Field (CF) of each gPTP event (Sync) message. As such, the relative accuracy of the 5G residence time measured between ingress and egress is essential for accurate TSN GM clock timing information delivered over 5G networks.

In the 5G network, the UE, the gNB, the UPF, the NW-TT, and the DS-TT are synchronized with a grandmaster 5GSC ("5G GM" in FIG. 5), either directly or indirectly. In general, the 5GSC is made available to all UP nodes in the 5G network via a PTP-compatible transport network. Likewise, 5GSC is made available to UEs via signaling of absolute timing of radio frames. In FIG. 5, solid lines are used to denote flow of 5GSC synchronization between respective synchronization master ("M") and slave ("S") elements in the 5G network. Likewise, dashed lines are used to denote flow of TSN GM synchronization between respective synchronization master ("M") and slave ("S") elements in the TSN domain. In general, the two synchronization processes can be independent from each other and the gNB only needs to be synchronized to the 5GSC.

To summarize, the time synchronization solution defined in 3GPP TS 23.501 (v16.4.0) only requires NG-RAN nodes (e.g., gNBs) to be synchronized to the 5G network reference time (i.e., based on 5GSC) while TSN GM timing is delivered to UEs and endpoints transparently through the 5G network using gPTP signaling. For 5GSC synchronization, a UE relies on its serving gNB providing reference time periodically, either via broadcast or unicast signaling. For example, reference time information can be delivered via broadcast in SI block SIB9 or via unicast via the RRC message DownlinkInformationTransfer. To support time sensitive communications, a reference time granularity of 10 ns is defined in 3GPP TS 23.501.

FIG. 6 illustrates an exemplary reference time update procedure between a UE and a serving gNB. In SFNx, the gNB transmits a reference time message (e.g., SIB9 or unicast) with a 5G reference time value ($t_R$) and a corresponding reference event on the radio interface for the cell. In the example shown in FIG. 6, the reference event is the end of SFNz that is subsequent to SFNx. For SIB9, the value of SFNz is implicitly indicated as the SFN boundary at or immediately after the ending boundary of the SI-window in which SIB9 is transmitted. When the reference time is sent in a unicast message, the reference cell of the time at the ending boundary of the SFN indicated by the referenceSFN field is the UE's PCell. The UE receives the reference time message in advance of the reference event and subsequently synchronizes its internal clock with the reference time $t_R$ that occurs at the end of SFNz.

NG-RAN nodes, such as gNBs, can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Each DU is a logical node that hosts lower-layer protocols and can include, depending on the functional split, various subsets of the gNB functions. In the context of providing reference time to UEs, the SIB and RRC unicast messages are generated by a CU and, preferably, the reference event is referenced on the radio interface provided by the DU. Thus, a DU can overwrite SIBS for broadcast delivery. For unicast delivery, a DU reports 5GSC time at reference event (e.g., SFN) to CU, which generates the unicast RRC message that includes the reported timing relationship.

FIG. 7 shows an ASN.1 data structure for an exemplary ReferenceTimeInfo information element (IE) used to provide the reference time to a UE. The IE includes a time field that is defined as a ReferenceTime structure that includes fields for days, seconds, milliseconds (ms), and tens of nanoseconds (ns). The IE also includes a referenceSFN that defines the reference event on the radio interface. In addition, the uncertainty field reflects a level of uncertainty in the provided timing relationship. This includes two factors: 1) the accuracy with which a gNB implementation can ensure that the indicated reference time corresponding to reference point will reflect the actual time when that reference point occurs at the antenna reference point, and 2) the accuracy with which the 5G reference time is acquired by the gNB. The actual uncertainty is 25 ns multiplied by the integer value in this field. If this field is absent, the uncertainty is unspecified.

If the timeInfoType is not included in the IE, the time field indicates the GPS time and the origin of the time field is 00:00:00 on Gregorian calendar date 6 Jan. 1980 (i.e., start of GPS time). If timeInfoType is set to localClock, the origin of the time is unspecified.

In addition, to support time-sensitive communications in Rel-16, the UE Assistance Information procedure has been extended to allow a UE to indicate its preference(s) for receiving 5G reference time information. FIG. 8 shows an ASN.1 data structure for a UEAssistanceInformation message by which a UE can indicate these preferences. In particular, the reference TimeInfoPreference IE is a Boolean value that indicates when the UE's preference for reference time information has changed, i.e., from true to false or from false to true. The UE cannot send another indication with the same value. Once UE send the preference request, UE relies on periodic gNB broadcast/unicast to refresh its reference time and should no longer re-send the request to the network.

One problem that arises in determining these timing relationships is the radio frequency (RF) propagation delay (PD) of the signal from the gNB to the UE, which is proportional to the distance between gNB and UE. For example, a UE that is 300 m distant from the gNB antenna will experience a propagation delay of approximately one microsecond. As such, even if the gNB provides the UE with a 5GSC time, the TSN time derived by the UE may be inaccurate (e.g., offset) by the amount of the PD. Put differently, a TSN-5GSC timing relationship is only accurate up to the point of transmission of the TSN message by the gNB, e.g., at the gNB's transmission antenna(s). Furthermore, UEs may experience PDs that vary with time as the distance to the serving gNB changes and/or the serving gNB changes. Likewise, different UEs served by the same gNB may experience different PDs.

Since the most stringent end-to-end synchronization requirement for time-sensitive applications is also one microsecond, the propagation delay from the gNB to the UE must be considered. The 3GPP Timing Advance command (see 3GPP TS 38.133 v16.2.0) is used for UE uplink (UL) transmission synchronization. This may be needed due to changes in the UE propagation environment and/or distance between the UE and the serving base station (e.g., gNB). At connection setup, an absolute timing correction is communicated to a UE using a medium access control (MAC) random access response (RAR) element. After connection setup, a relative timing correction can be sent to a UE using a MAC control element (CE).

The downlink (DL) propagation delay (PD) can be estimated for a given UE by (a) summing the TA value indicated by the initial absolute TA value and all subsequent relative TA values, and (b) taking some portion of the resulting total TA value to represent DL-only delays. For example, 50% could be used assuming the downlink and uplink propagation delays are essentially the same. The estimated PD can then be used to understand time synchronization dynamics, e.g., for accurately tracking and/or compensating the value of a 5GSC at the UE side relative to the value of that clock in some other network node.

3GPP Rel-17 extended TSN capabilities by allowing a TSN GM clock to be located in a first UE with a TSN slave clock located in a second UE. This means that the TSN GM clock must go through two Uu (radio) interfaces in order to synchronize the TSN slave clock, which puts a stricter requirement on the reference time delivery accuracy over each Uu interface.

Up to 540 ns of uncertainty can be introduced when sending the 5G reference time over a single Uu interface and adjusting it using the DL propagation delay value determined using the legacy TA method. Supporting a 5GS path that includes two Uu interfaces will thus be problematic since timestamping based on 5G reference time is used to measure the delay between 5GS ingress and 5GS egress and the maximum uncertainty introduced when relaying a TSN Grandmaster clock from ingress to egress is to be less than 900 ns.

It has been agreed in 3GPP RAN2 working group (WG) that a target for reference time delivery accuracy over each Uu interface can be as low as −200 ns. This strict accuracy (or uncertainty) target implies the need for an enhanced propagation delay compensation method. One possible solution is to enhance TA-based methods with a more granular TA command. A second possible solution is a round-trip-time (RTT)-based positioning method standardized by 3GPP for NR. In this technique, a UE computes a difference between its receive and transmit times ("Rx-Tx time difference") and multiple gNBs compute their own Rx-Tx time differences for the UE. The results are combined to find the UE position based upon round trip time (RTT) calculation.

Once a UE has received 5G reference time from the NG-RAN and adjusted it to reflect DL PD, it is expected to maintain 5G reference time with suitable accuracy until the next refresh thereof. Thus, an NG-RAN node (e.g., gNB) may need to periodically refresh UE 5G reference time. Reference time delivery from a gNB to a UE can be by unicast message or broadcast (i.e., SIBS). The nominal periodicity $T_n$ of broadcast reference time delivery is left to network implementation. However, $T_n$ can reflect the UE clock stability and gNB clock stability in relation to the 5G GM clock used as the basis of the 5G reference time, etc. Due to various reasons, the UE's connection to the serving gNB might be lost temporarily, causing the UE to miss refreshes of reference time information. This can be detrimental for time-sensitive applications that rely on the UE to maintain close time synchronization with the 5GSC.

One example of this scenario is during handover, when a UE transitions from a source cell served by one network node to a target cell served by the same or a different network node. It is possible that the UE may miss one or more refreshes of reference time information during handover, particularly if the periodicity of these refreshes is very frequent relative to the duration of the handover. In some cases, handover to an initial target cell may fail, causing the UE to try additional target cells and/or to return to idle mode and establish a new connection with the network. This interruption can cause the UE to miss multiple reference time updates. Even after a successful handover to a target cell served by a different network node, there can be delays in the new serving node preparing reference time information for delivery to the UE.

The duration of interruption during handover needs to be considered when determining the periodicity of the network's transmission of reference time information to the UE. FIG. 9 shows a timing diagram that illustrates an exemplary scenario of interruption due to handover. In this scenario, the network updates the reference time information with a nominal periodicity of t1 (i.e., Tn=t1), which is interrupted for duration t2 during handover. Due to the interruption, the worst-case delay between two reference time deliveries is $t_1+t_2$, which is greater than Tn for t2>0 (i.e., a non-zero duration of the interruption).

To mitigate the impact of the interruption time t2 the periodic refresh period (t1) should be made smaller (more frequent) to help reduce the time from the last reference time transmission in the source cell until handover is finished. A smaller periodic refresh period (t1) increases signaling overhead on the Uu interface, while reducing interruption time (t2) in reference time delivery due to handover interruption and target cell preparation time can reduce signaling overhead on the Uu interface.

Handover interruption time can be reduced to near zero with mobility enhancements features introduced in Rel-16. However, this does not address target NG-RAN node preparation time. Even with zero handover interruption time, there is a need for the target NG-RAN node to acquire the knowledge that the UE needs reference time delivery so that the target NG-RAN node can prepare the reference time delivery early on.

For unicast delivery, it is left to gNB implementation whether to provide a single or periodic transmission of the reference time to a UE. The implementation choice can depend on gNB intended cell coverage range and UE synchronization requirements. Thus, it is possible that a particular gNB does not support all reference time delivery mechanisms. This can cause various problems, issues, and/ or difficulties when UEs requiring synchronization are handed over between cells served by different gNBs. For example, a UE may not be able to meet its synchronization performance requirement during handover between gNBs supporting different reference time delivery mechanisms.

Embodiments of the present disclosure address these and other problems, issues, and/or difficulties by techniques for a source node (e.g., gNB or ng-eNB) serving the UE's handover source cell to inform a target node (e.g., gNB or ng-eNB) serving the UE's handover target cell about the reference time delivery mechanism(s) supported by the source node in the source cell. For example, the source node can inform the target node whether it uses broadcast and/or unicast for reference time delivery, as well as any periodicity of the reference time delivery in the source cell or for the particular UE. Based on such information, the target node can initiate and/or adjust reference time delivery to the UE in the target cell in a manner that is consistent with the source cell and/or the UE's synchronization requirements.

Embodiments can provide various benefits and/or advantages. For example, embodiments can facilitate reference time delivery during UE handover, thereby allowing UEs to meet their respective synchronization performance requirements during and/or after handover. As another example, embodiments can facilitate pre-handover selection of a preferred target cell for a UE, based on whether target nodes associated with respective target cells can fulfill the UE's synchronization performance requirements during and/or after handover.

During UE handover, the source and target nodes may communicate via their respective Xn or NG interfaces. In some embodiments, the source node can provide the target node information about how the source node delivers reference time to the UE and/or any UE preferences for receiving 5G reference time. This information may be referred to herein as a "reference time delivery configuration". In various embodiments, the source node can provide any of the following:

Signaling method, e.g., whether broadcast or unicast is used for reference time delivery by the source node. Based on this information, the target node can determine whether individual propagation delay compensation is required.

Delivery periodicity. For unicast delivery, the source node can also indicate non-periodic delivery, e.g., one-shot delivery. Based on this information, the target node can determine a periodicity needed for reference time delivery to the UE in the target cell.

Accuracy or uncertainty of the reference times. The parameter can be provided or indicated in absolute terms (e.g., as one of several enumerated values, in units of μs and/or ns) or as whether Rel-16 (1 μs) or Rel-17 (200 ns) target is needed.

Use of propagation delay compensation (and if used, configuration and/or parameters). Example parameters include type of propagation delay compensation (e.g., TA-based or RTT-based), last propagation delay compensation value, estimated propagation delay, estimated distance between source node and UE, source node position (facilitating target node estimation of distance/delay to UE), propagation delay compensation update time, and estimated UE speed. In case of RTT-based compensation technique, the parameters can also include whether the RTT estimation is performed by UE or source node.

Upon receiving the above information, the target node prepares for transmission of the reference time in the target cell to the incoming UE, e.g., by trigging the time reference reporting from the serving DU or adjusting an existing reference time reporting periodicity. The target node could also prepare to fulfill the Uu interface reference time delivery accuracy (or uncertainty) target and the propagation delay compensation.

In some embodiments, the target node can provide the source node (e.g., before handover) an indication of how well the target node can fulfill or align with the reference time delivery information provided by the source node. This is also referred to as an "indication of compliance". Based on this indication of compliance, the source node can select from among multiple target nodes prepared for the handover, so as to facilitate sufficient and/or best available time synchronization performance for the UE during and/or after a handover.

In some embodiments, the target node can store the received information and use the same delivery method (e.g., broadcast or unicast) and delivery parameters (e.g., periodicity, etc.) indicated by the source node. This can be useful in the various scenarios in which the broadcast and unicast methods are used for different purposes, including the examples given below.

For example, to achieve the strict Rel-17 200 ns accuracy requirement on the Uu interface, the only feasible solution may be that the gNB pre-compensates the propagation delay and once UE receives that information, it delivers the reference time to upper layers directly. The gNB pre-compensation method is only feasible with unicast delivery since compensation is typically UE-specific. In some embodiments, if the source node indicates unicast delivery to the UE, then the target node infers that the UE may have a strict synchronization requirement and that delay pre-compensation is required, which can only be met with unicast delivery by the target node. On the contrary, if the source node indicates broadcast delivery to the UE, then the target node infers that more complex unicast delivery is unnecessary to meet the UE's (less strict) requirements.

As another example, propagation delay compensation may be unnecessary but there is a need to differentiate between UE reference time delivery requirements (e.g., based on subscription). In general, unicast messages can provide a more accurate reference delivery (e.g., by setting the uncertainty indication to a very small value). Moreover, unicast messages can be encrypted so that they can be read only by intended UEs that have specific subscriptions. For other UEs, the gNB can broadcast reference time information with acceptable accuracy (e.g., by setting the uncertainty indication to a normal value). In this situation, it is more reasonable to use the same delivery method in both the source and the target node.

As another example, broadcast messages can be received by all UEs in a cell, and, if reference time is already being broadcast (e.g., in SIB9) in the target cell, then it is almost no extra effort for the target node to deliver reference time to another incoming UE. As such, it is beneficial for the target node to know if this UE's requirements can be satisfied by a broadcast delivery rather than the more complex unicast messaging.

In some embodiments, if the source node indicates that unicast reference time delivery is used for the UE in the source cell, then the target node also adopts unicast delivery for the UE in the target cell (so long as the UE is handed over to the target cell). On the other hand, if the source node indicates that broadcast reference time delivery is used for the UE in the source cell, then the target node can adopt either unicast or broadcast delivery for the UE in the target cell. One motivation for this approach is that there is no mandatory requirement in 3GPP TS 38.331 (v16.3.1) for UE actions upon receiving SIB9. In particular, section 5.2.2.4.10 states that "upon receiving SIB9 with referenceTimeInfo, the UE may perform the related actions as specified in subclause 5.7.1.3."

Consequently, if unicast delivery is used in the source node, then implies a guarantee that the UE would deliver a received message to upper layers, and this guarantee can be continued for unicast delivery in the target cell. On the other hand, if broadcast delivery is used in the source node, the target node can choose either unicast or broadcast delivery for the UE in the target cell.

In other embodiments, the source node can indicate to the target node a target reference time delivery accuracy or uncertainty (e.g., 200 ns, 300 ns, etc.) associated with the indicated delivery method. In this case, the target node can select broadcast or unicast based on fulfillment of the target accuracy. For example, if the target accuracy is 200 ns and the source node is a macro cell that covers a large service area, the source node must use unicast to carry a UE-specific pre-compensated propagation delay. However, if the target node is a small cell with 50-m radius, then it may not need delay pre-compensation and broadcast delivery may be sufficient to provide the indicated 200 ns target accuracy.

In some embodiments, the target node can provide an indication, to the source node during execution of the UE handover, of how well it can fulfill and/or align with the information provided by the source node. The source node can use the information to select the best target cell and/or target node, in case multiple target cells and/or target nodes have been prepared.

In other embodiments, an operations administration and maintenance (OAM) system can configure the reference time delivery parameters used in the various nodes (e.g., eNBs, gNBs, ng-eNBs, etc.) deployed in the wireless network. Based on this configuration, the source and target nodes involved in the handover can use the same (or at least compatible) methods and/or parameters for reference time delivery.

Table 1 below shows an exemplary structure of a TSN Time Reference Information IE used by a source node to provide a reference time delivery configuration to a target node. For example, this IE can be included in a handover request message for a particular UE, transmitted over an Xn interface between the source and target nodes. Alternately, this IE can be included in a transparent container sent through 5GC from the source node to the target node via their respective NG interfaces.

TABLE 1

| IE/Group Name | Pres. | IE type/ref. | Semantics description |
|---|---|---|---|
| Uncertainty | M | INTEGER (0 . . . 32767, . . . ) | This field indicates the uncertainty of the reference time information provided in ReferenceTimeInfo IE, refer to 6.3.2 of TS 38.331 [8]. |
| Time Information Type | M | ENUMERATED (localClock) | |
| TSN distribution | M | ENUMERATED (broadcast, unicast, . . . ) | |
| Periodicity | M | INTEGER (0 . . . 640000, . . . ) | Periodicity expressed in units of 1 us. |

Alternately, the TSN Time Reference Information IE sent in the handover request message via the Xn interface can be defined by the following exemplary ASN.1 data structure:

```
*** Begin ASN.1 data structure ***
TSNTimeRefInfo ::= SEQUENCE {
    uncertainty              Uncertainty,
    timeInformationType      TimeInformationType,
    tSNdistribution          TSNdistribution,
    periodicity              Periodicity,
    iE-Extensions            ProtocolExtensionContainer
                             {{TSNTimeRefInfo-ExtIEs}} OPTIONAL
}
TSNTimeRefInfo-ExtIEs    XNAP-PROTOCOL-EXTENSION ::= {
...
}
Uncertainty ::= INTEGER (0..32767,..)
TimeInformationType ::= ENUMERATED {localClock}
TSNdistribution ::= ENUMERATED {broadcast, unicast}
Periodicity ::= INTEGER (0..640000,..)
*** End ASN.1 data structure ***
```

Alternately, the TSN Time Reference Information IE sent in the transparent container via the NG interface can be defined by the following exemplary ASN.1 data structure:

```
*** Begin ASN.1 data structure ***
TSNTimeRefInfo :== SEQUENCE {
    uncertainty              Uncertainty,
    timeInformationType      TimeInformationType,
    tSNdistribution          TSNdistribution,
    periodicity              Periodicity,
    iE-Extensions            ProtocolExtensionContainer
                             {{TSNTimeRefInfo-ExtIEs}} OPTIONAL
}
TSNTimeRefInfo-ExtIEs    NGAP-PROTOCOL-EXTENSION :== {
...
}
Uncertainty :== INTEGER (0..32767,..)
TimeInformationType :== ENUMERATED {localClock}
TSNdistribution :== ENUMERATED {broadcast, unicast}
Periodicity :== INTEGER (0..640000,..)
*** End ASN.1 data structure ***
```

These embodiments described above can be further illustrated with reference to FIGS. 10-11, which depict exemplary methods (e.g., procedures) performed by a source node and a target node, respectively. Put differently, various features of the operations described below correspond to various embodiments described above. Although the exemplary methods are illustrated in FIGS. 10-11 by specific blocks in a particular order, the operations corresponding to the blocks can be performed in different orders than shown and can be combined and/or divided into blocks having different functionality than shown. Furthermore, the exemplary methods shown in FIGS. 10-11 can be complementary to each other, such that they can be used cooperatively to provide various benefits, advantages, and/or solutions to problems, including those described herein. Optional blocks and/or operations are indicated by dashed lines.

In particular, FIG. 10 illustrates an exemplary method (e.g., procedure) for a source node for handover of a UE from a source cell served by the source node in a wireless network, according to various embodiments of the present disclosure. For example, the exemplary method shown in FIG. 10 can be implemented in a network node (e.g., base station, eNB, gNB, ng-eNB, etc.) such as described elsewhere herein.

The exemplary method illustrated in FIG. 10 can include the operations of block 1010, in which the source node can transmit, in the source cell according to a reference time delivery configuration, one or more messages that include respective reference times in relation to corresponding source cell transmission events. The ReferenceTimeInfo IE shown in FIG. 7 is an exemplary way to provide a reference time in relation to a source cell transmission event. The exemplary method can also include the operations of block 1020, in which the source node can transmit, to a target node in the wireless network, the reference time delivery configuration (i.e., used in the source cell) in relation to a request to handover the UE from the source cell to a target cell served by the target node.

In some embodiments, the reference time delivery configuration can include one or more of the following:
    signaling method used to deliver the messages;
    delivery periodicity;
    accuracy or uncertainty of the delivered reference times;
    indication of whether propagation delay compensation is included in the delivered reference times; and
    configuration of propagation delay compensation.

In some of these embodiments, the signaling method can be one of broadcast signaling and unicast signaling. In some of these embodiments, the accuracy or uncertainty can be either 200 ns (e.g., as in Rel-17) or 1 $\rho$s (e.g., as in Rel-16). In some of these embodiments, the accuracy or uncertainty is also included in the messages with the respective reference times. In some of these embodiments, the delivery periodicity can be one of an enumerated set of values that includes non-periodic or one-shot delivery.

In some of these embodiments, the configuration of propagation delay compensation can include one or more of the following: propagation delay compensation method, most recent propagation delay compensation, estimated propagation delay in the source cell, estimated distance between source node and UE, source node position, estimated UE speed, and update time for propagation delay compensation.

In some embodiments, the reference time delivery configuration is transmitted together with the request to handover the UE to the target cell. In other embodiments, the reference time delivery configuration is transmitted before the request to handover the UE to the target cell. In such case, the exemplary method can also include the operations of block 1030, where the source node can receive, from the target node, an indication of compliance with the reference time delivery configuration for the UE in the target cell.

In some of these embodiments, the exemplary method can also include the operations of blocks 1040-1060. In block 1040, the source node can transmit the reference time delivery configuration to one or more further target nodes that serve respective further target cells prepared for handover of the UE from the source cell. In block 1050, the source node can receive, from the further target nodes, respective indications of compliance with the reference time delivery configuration for the UE in the respective further target cells. In block 1060, the source node can select the target cell for handover of the UE from the source cell, based on the received indications of compliance with the reference time delivery configuration in the target cell and the further target cells. More generally, the source node can select any cell from the target cell and further target cells for handover of the UE based on the respective indications of compliance for those target cells. As such, the target cell and the further target cells can be considered "candidate target cells" prior to selection, with the selected cell becoming the actual "target cell" for handover.

In addition, FIG. 11 illustrates an exemplary method (e.g., procedure) for a target node for handover of a UE to a target cell served by the target node in a wireless network, according to various embodiments of the present disclosure. For example, the exemplary method shown in FIG. 11 can be implemented in a network node (e.g., base station, eNB, gNB, ng-eNB, etc.) such as described elsewhere herein.

The exemplary method illustrated in FIG. 11 can include the operations of block 1110, in which the target node can receive, from a source node in the wireless network, a reference time delivery configuration used in the source cell to deliver messages, to the UE, that include respective reference times in relation to corresponding source cell transmission events. The reference time delivery configuration is received in relation to a request to handover the UE to the target cell. The exemplary method can also include the operations of block 1120, in which the target node can determine a reference time delivery configuration for the target cell based on the received reference time delivery configuration.

The exemplary method can also include the operations of block 1150, in which the target node can transmit, in the target cell according to the determined reference time delivery configuration, one or more messages that include respective reference times in relation to corresponding target cell transmission events. The ReferenceTimeInfo IE shown in FIG. 7 is an exemplary way to provide a reference time in relation to a target cell transmission event. In some embodiments, the one or more messages are transmitted in the target cell after completion of the requested handover of the UE to the target cell.

In some embodiments, the received reference time delivery configuration (i.e., used in the source cell) can include one or more of the following:

signaling method used to deliver the messages;
  delivery periodicity;
  accuracy or uncertainty of the reference times delivered by the source node;
  indication of whether propagation delay compensation is included in the delivered reference times delivered by the source node; and
  configuration of propagation delay compensation.

In some embodiments, the signaling method can be one of broadcast signaling and unicast signaling. In some embodiments, the determining operations of block 1120 can include the operations of sub-block 1121, where the target node can select the same signaling method for the target cell as used in the source cell.

In other embodiments, the determining operations of block 1120 can include the operations of sub-blocks 1122-1123. In sub-block 1122, when unicast signaling is used in the source cell, the target node can select unicast signaling to deliver the messages to the UE in the target cell. In sub-block 1123, when broadcast signaling is used in the source cell, the target node can select either unicast signaling and broadcast signaling to deliver the messages to the UE in the target cell, based on one or more of the following:

parameters of the received reference time delivery configuration, other than the signaling method; and
  whether broadcast signaling is currently used for reference time delivery in the target cell.

In some embodiments, the accuracy or uncertainty (e.g., in the received reference time delivery configuration) can be either 200 ns (e.g., as in Rel-17) or 1 μs (e.g., as in Rel-16). In some embodiments, the accuracy or uncertainty is also included in the messages with the respective reference times.

In some embodiments, the determining operations of block 1120 can include the operations of sub-block 1124, where when the accuracy or uncertainty is less than or equal to 200 ns, the target node can select one or more of the following based on a coverage area or radius of the target cell: signaling method used to deliver the messages to the UE, and configuration of propagation delay compensation for the UE.

In some embodiments, the delivery periodicity (e.g., in the received reference time delivery configuration) can be one of an enumerated set of values that includes non-periodic or one-shot delivery. In some embodiments, the configuration of propagation delay compensation (e.g., in the received reference time delivery configuration) can include one or more of the following: propagation delay compensation method, most recent propagation delay compensation, estimated propagation delay in the source cell, estimated distance between source node and UE, source node position, estimated UE speed, and update time for propagation delay compensation.

In some embodiments, the reference time delivery configuration is received together with the request to handover the UE to the target cell. In other embodiments, the reference time delivery configuration is received before the request to handover the UE to the target cell. In these embodiments, the exemplary method can also include the operations of blocks 1130-1140. In block 1130, the target node can determine compliance of the determined reference time delivery configuration with the received reference time delivery configuration. In block 1140, the target node can send, to the source node, an indication of compliance with the received reference time delivery configuration.

Figure 12:
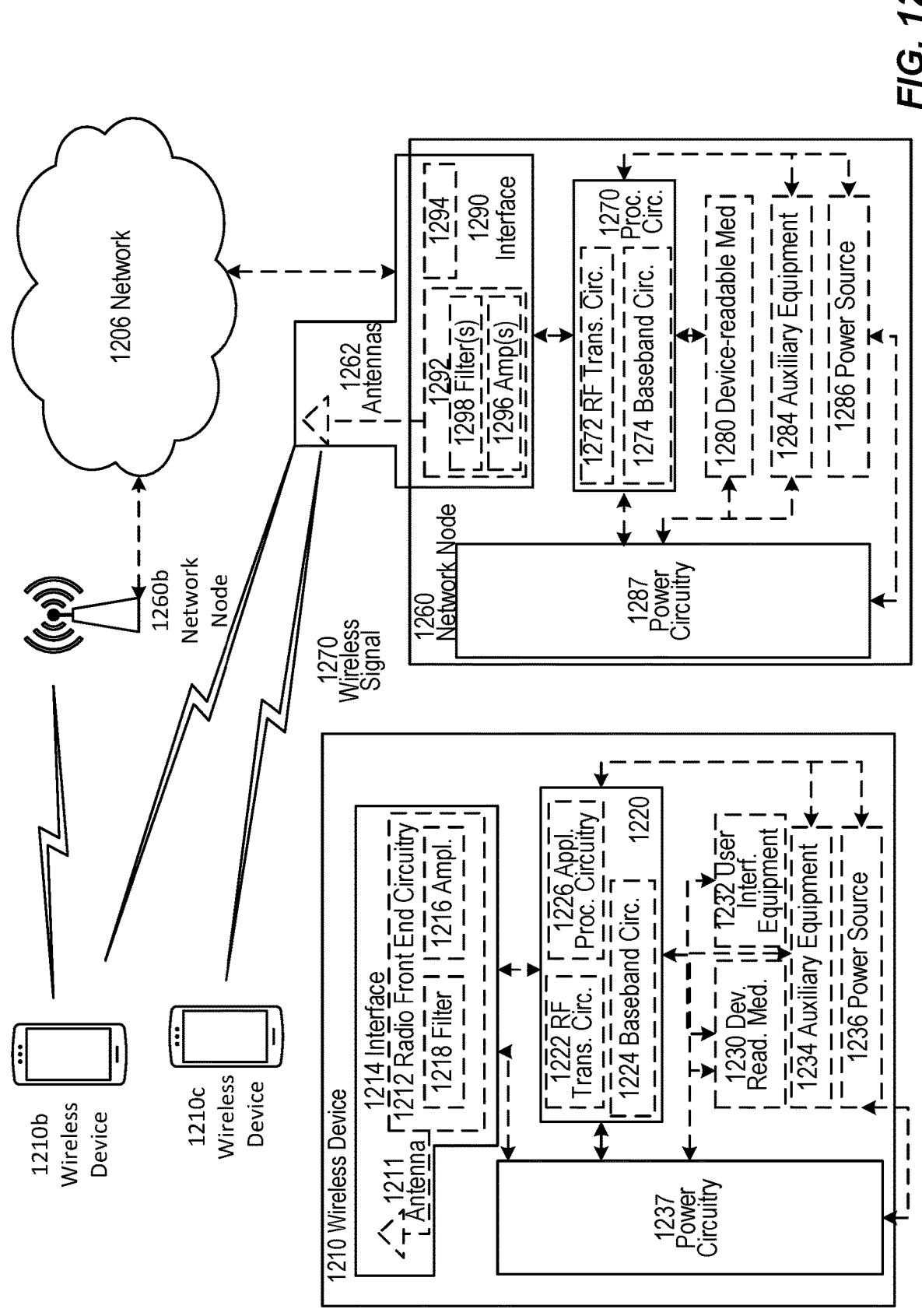
FIG. 12 illustrates an exemplary wireless network, according to various embodiments of the present disclosure.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions, methods, and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and a RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line-of-sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processor 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
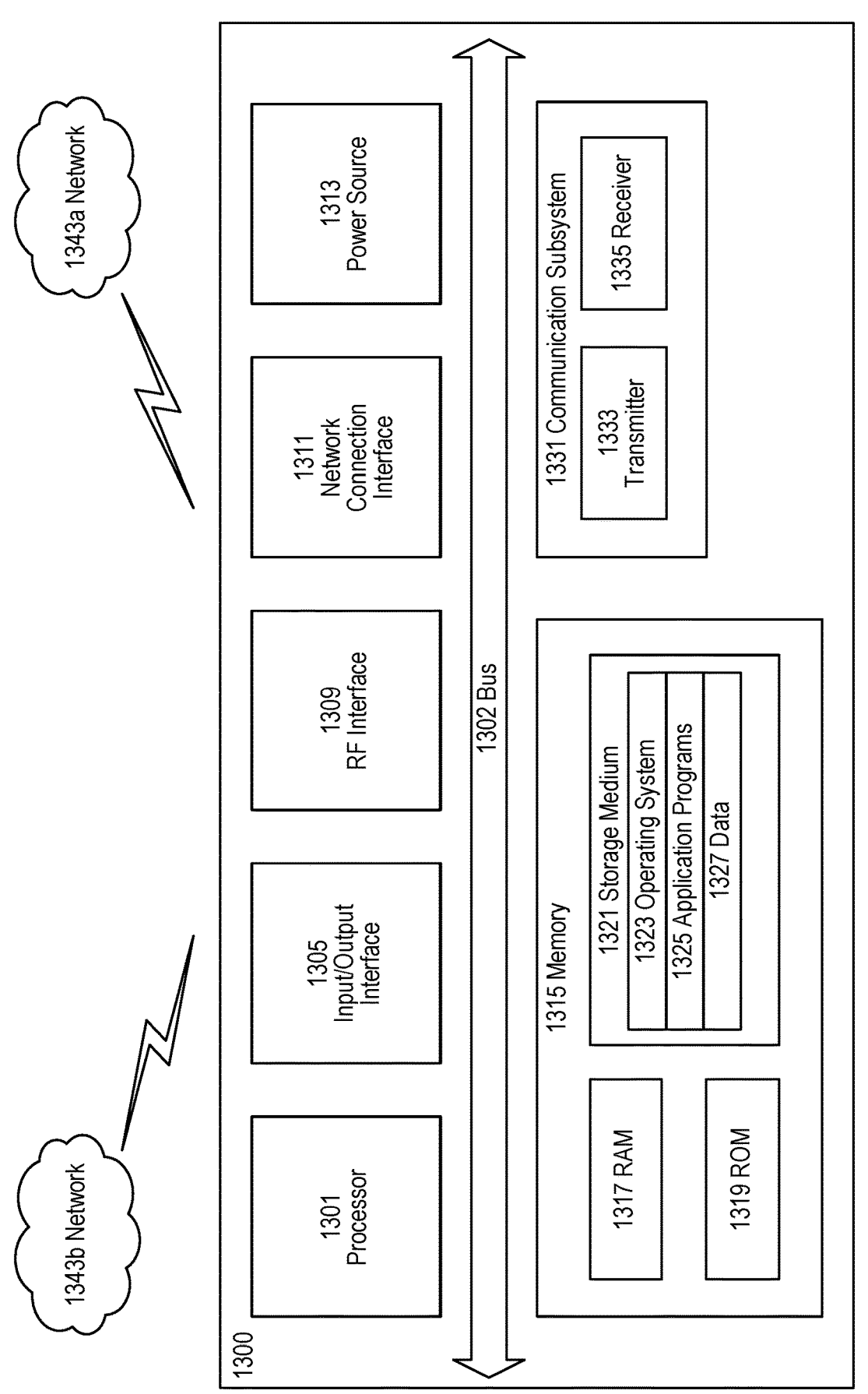
FIG. 13 illustrates an exemplary UE, according to various embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 13200 can be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE. Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343*a*. Network 1343*a* can encompass wired and/or wireless networks such as a local-area network (LAN), a wide-area network (WAN), a computer network, a wireless network, a telecommunications network, another like network or any combination thereof. For example, network 1343*a* can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1321 can be configured to include operating system 1323; application program 1325 such as a web browser application, a widget or gadget engine or another application; and data file 1327. Storage medium 1321 can store, for use by UE 1300, any of a variety of various operating systems or combinations of operating systems. For example, application program 1325 can include executable program instructions (also referred to as a computer program product) that, when executed by processor 1301, can configure UE 1300 to perform operations corresponding to various exemplary methods (e.g., procedures) described herein.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343*b* using communication subsystem 1331. Network 1343*a* and network 1343*b* can be the same network or networks or different network or networks. Communication subsystem 1331 can be configured to include one or more transceivers used to communicate with network 1343*b*. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343*b* can encompass wired and/or wireless networks such as a local-area network (LAN), a wide-area network (WAN), a computer network, a wireless network, a telecommunications network, another like network or any combination thereof. For example, network 1343*b* can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
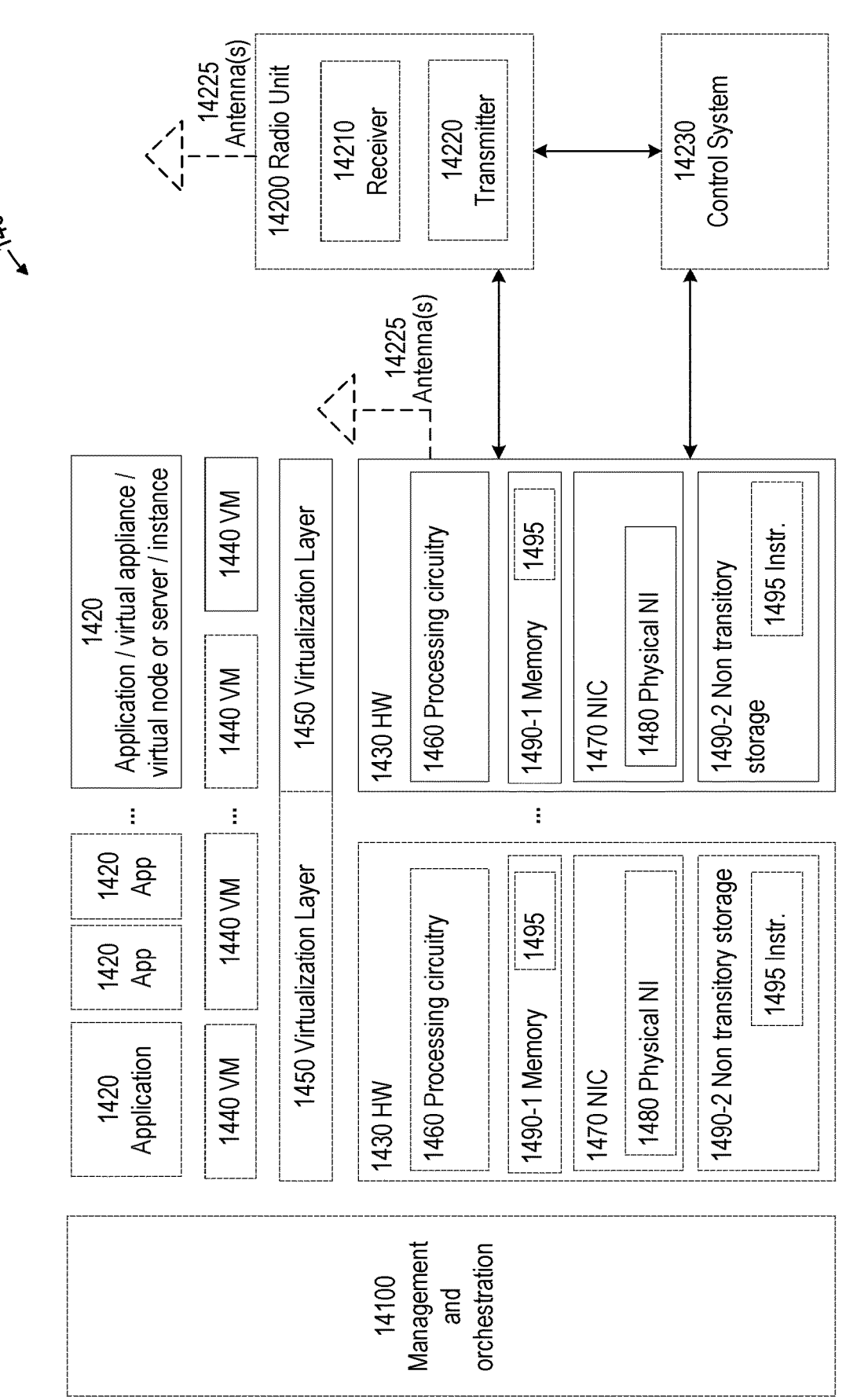
FIG. 14 is a block diagram illustrating an exemplary virtualization environment usable for implementing various embodiments of the present disclosure.

FIG. 14 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400 can include general-purpose or special-purpose network hardware devices (or nodes) 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. For example, instructions 1495 can include program instructions (also referred to as a computer program product) that, when executed by processing circuitry 1460, can configure hardware node 1420 to perform operations corresponding to various exemplary methods (e.g., procedures) described herein. Such operations can also be attributed to virtual node(s) 1420 that is/are hosted by hardware node 1430.

Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise antenna 14225 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network element (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 14230, which can alternatively be used for communication between the hardware nodes 1430 and radio units 14200.

Figure 15:
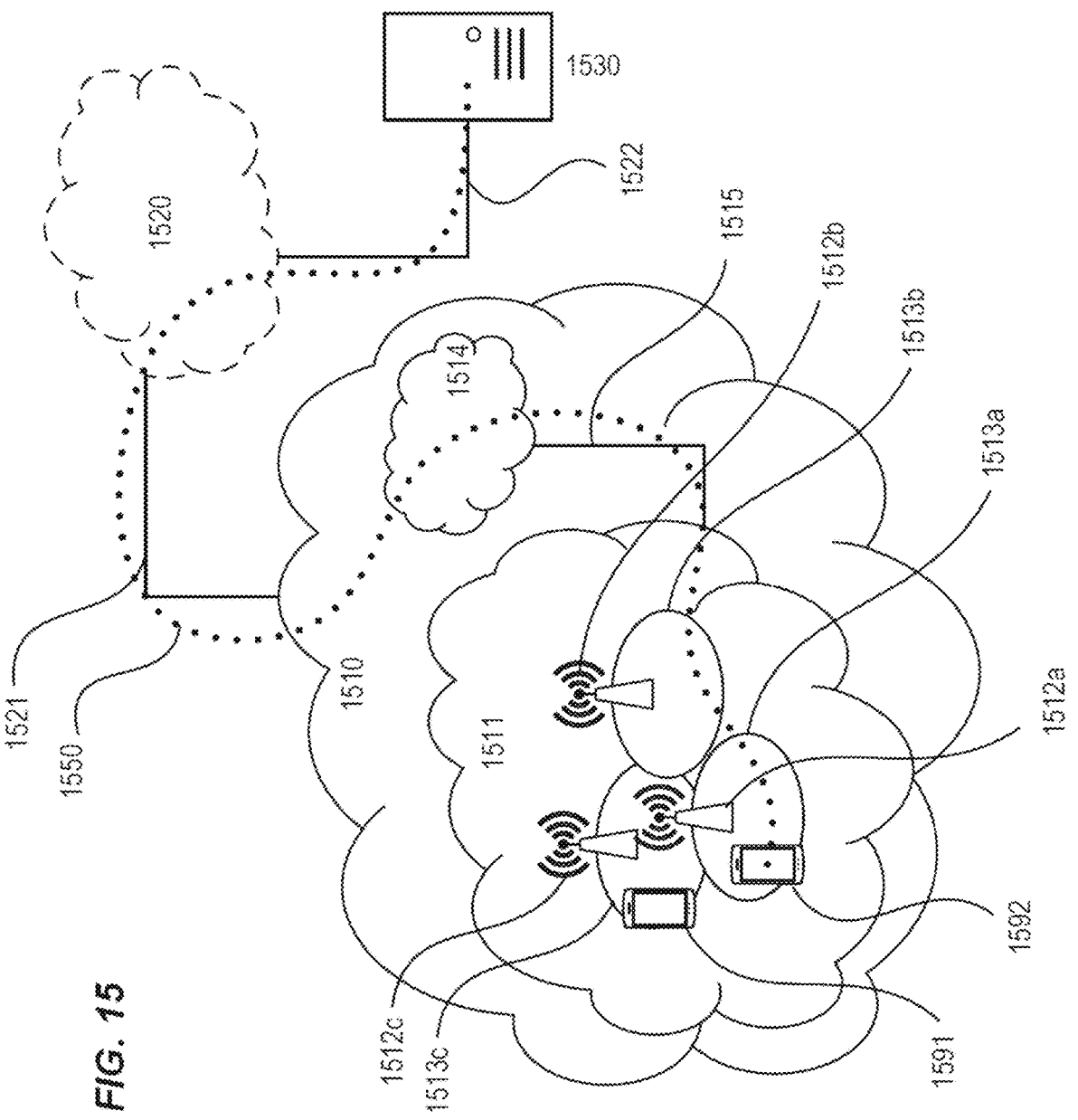
FIGS. 15-16 are block diagrams of exemplary communication systems and/or networks, according to various embodiments of the present disclosure.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct, or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 16:
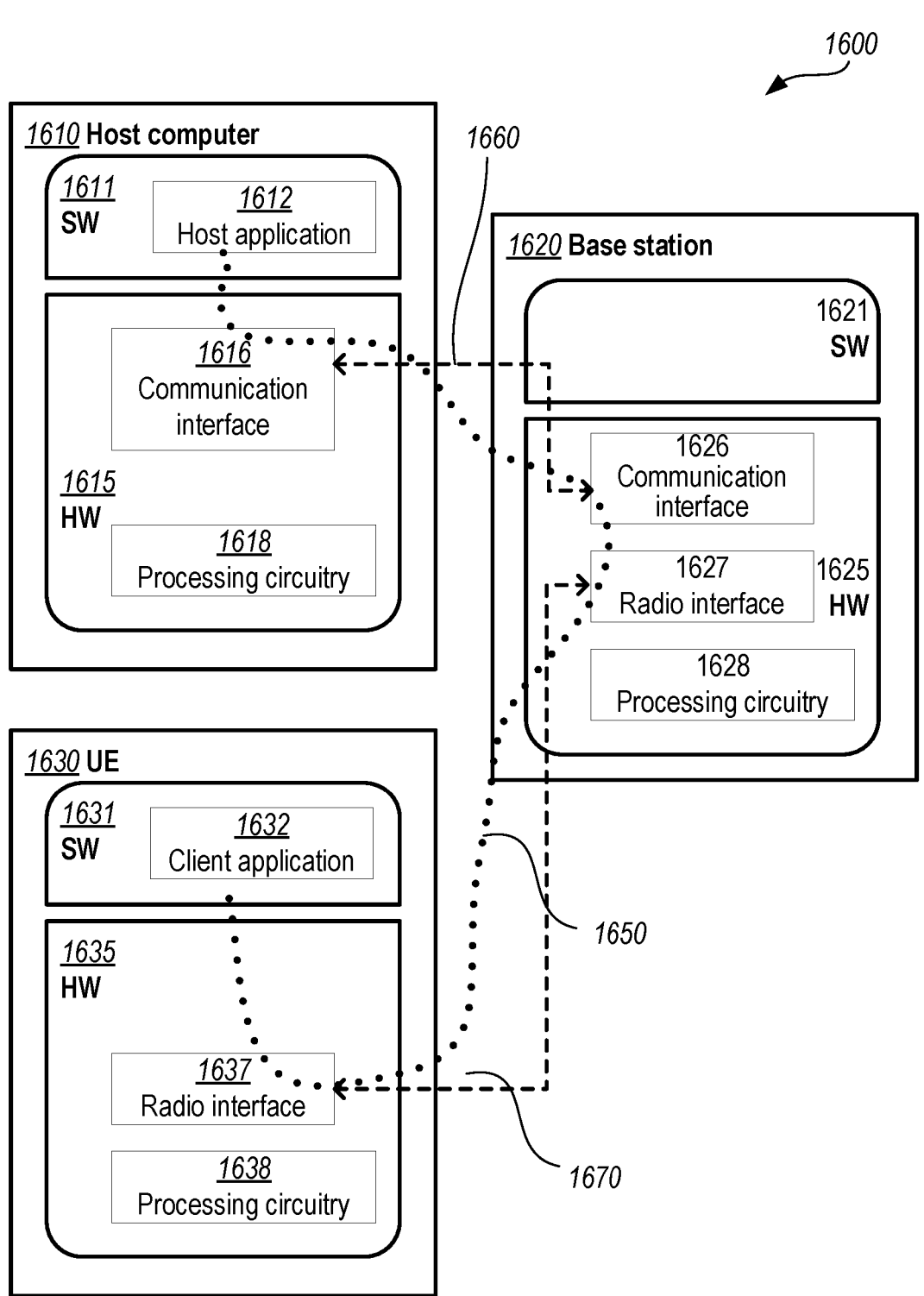

As an example, host computer 1610, base station 1620 and UE 1630 illustrated in FIG. 16 can be similar or identical to host computers or base stations described in relation to other figures herein. For example, the inner workings of these entities can be as shown in FIG. 16 and independently, the surrounding network topology can be that shown in other figures herein.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above or by supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

FIG. 17 is a flowchart illustrating an exemplary method and/or procedure implemented in a communication system, in accordance with one embodiment. The communication system includes a host computer, a base station and a UE which, in some embodiments, can be those described with reference to other figures herein. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

Embodiments of the techniques and apparatus described herein also include, but are not limited to, the following enumerated examples:

A1. A method performed by a source node for handover of a user equipment (UE) from a source cell served by the source node to a target cell served by a target node in a wireless network, the method comprising:

transmitting, in the source cell according to a reference time delivery configuration, one or more messages that include respective reference times in relation to corresponding source cell transmission events;

determining that the UE should be handed over from the source cell to the target cell; and transmitting, to the target node, the reference time delivery configuration in association with a handover request for the UE.

A2. The method of embodiment A1, wherein the reference time delivery configuration includes one or more of the following:

signaling method used to deliver the messages;

delivery periodicity;

delivery accuracy target;

indication of whether propagation delay compensation is included in the delivered reference times; and configuration of propagation delay compensation.

A3. The method of embodiment A2, wherein the signaling method is one of broadcast signaling and unicast signaling.

A4. The method of any of embodiments A2-A3, wherein the delivery accuracy target is one of the following: 200 ns or 1 μs.

A5. The method of any of embodiments A2-A4, wherein the delivery periodicity is one of an enumerated set of values that includes non-periodic or one-shot delivery.

A6. The method of any of embodiments A2-A5, wherein the configuration of propagation delay compensation includes one or more of the following: propagation delay compensation method, most recent propagation delay compensation, estimated propagation delay in the source cell, estimated distance between source node and UE, source node position, estimated UE speed, and update time for propagation delay compensation.

A7. The method of any of embodiments A1-A6, further comprising receiving, from the target node, a first indication of compliance with the reference time delivery configuration for the UE in the target cell.

A8. The method of embodiment A7, further comprising:

transmitting the reference time delivery configuration to a second target node serving a second target cell;

receiving, from the second target node, a second indication of compliance with the reference time delivery configuration for the UE in the second target cell; and based on the first and second indications of compliance, selecting the second target cell, instead of the target cell, for handover of the UE from the source cell.

B1. A method performed by a target node for handover of a user equipment (UE) from a source cell served by a source node to a target cell served by the target node in a wireless network, the method comprising:

receiving, from the source node, a reference time delivery configuration used in the source cell to deliver messages, to the UE, that include respective reference times in relation to corresponding source cell transmission events, wherein the reference time delivery configuration is received in associated with a request to handover the UE to the target cell;

based on the received reference time delivery configuration, determining a reference time delivery configuration for the target cell; and transmitting, in the target cell according to the determined reference time delivery configuration, one or more messages that include respective reference times in relation to corresponding target cell transmission events.

B2. The method of embodiment B1, wherein the received reference time delivery configuration used in the source cell includes one or more of the following:

signaling method used to deliver the messages;

delivery periodicity;

delivery accuracy target;

indication of whether propagation delay compensation is included in the delivered reference times; and configuration of propagation delay compensation.

B3. The method of embodiment B2, wherein the signaling method is one of broadcast signaling and unicast signaling.

B4. The method of any of embodiments B2-B3, wherein determining the reference time delivery configuration for the target cell comprises selecting the same signaling method for the target cell as used in the source cell.

B5. The method of embodiment B3, wherein determining the reference time delivery configuration for the target cell comprises:

when unicast signaling is used in the source cell, selecting unicast signaling to deliver the messages to the UE in the target cell; and when broadcast signaling is used in the source cell, selecting one of unicast and broadcast signaling to deliver the messages to the UE in the target cell based on one or more of the following:

parameters of the received reference time delivery configuration, other than the signaling method; and whether broadcast signaling is currently used for reference time delivery in the target cell.

B6. The method of any of embodiments B2-B3, wherein the delivery accuracy target is one of the following: 200 ns or 1 μs.

B7. The method of embodiment B6, wherein determining the reference time delivery configuration for the target cell comprises, when the delivery accuracy target is 200 ns, selecting one or more of the following based on a coverage area or radius of the target cell:

signaling method used to deliver the messages to the UE; and configuration of propagation delay compensation for the UE.

B8. The method of any of embodiments B2-B7, wherein the delivery periodicity is one of an enumerated set of values that includes non-periodic or one-shot delivery.

B9. The method of any of embodiments B2-B5, wherein the configuration of propagation delay compensation comprises one or more of the following: propagation delay compensation method, most recent propagation delay compensation, estimated propagation delay in the source cell, estimated distance between source node and UE, source node position, estimated UE speed, and update time for propagation delay compensation.

B10. The method of any of embodiments B1-B9, further comprising:

determining compliance of the determined reference time delivery configuration with the received reference time delivery configuration; and sending, to the source node, an indication of compliance with the received reference time delivery configuration.

B11. The method of any of embodiments B1-B10, wherein the one or more messages are transmitted in the target cell after completion of the requested handover of the UE to the target cell.

C1. A source node configured for handover of a user equipment (UE) from a source cell served by the source node to a target cell served by a target node in a wireless network, the source node comprising:

communication interface circuitry configured to communicate with the UE and with the target node; and processing circuitry operably coupled to the communication interface circuitry, whereby the processing circuitry and the communication interface circuitry are configured to perform operations corresponding to any of the methods of embodiments A1-A8.

C2. A source node configured for handover of a user equipment (UE) from a source cell served by the source node to a target cell served by a target node in a wireless network, the source node being further configured to perform operations corresponding to any of the methods of embodiments A1-A8.

C3. A non-transitory, computer-readable medium storing program instructions that, when executed by processing circuitry of source node configured for handover of a user equipment (UE) from a source cell served by the source node to a target cell served by a target node in a wireless network, configure the source node to perform operations corresponding to any of the methods of embodiments A1-A8.

C4. A computer program product comprising program instructions that, when executed by processing circuitry of source node configured for handover of a user equipment (UE) from a source cell served by the source node to a target cell served by a target node in a wireless network, configure the source node to perform operations corresponding to any of the methods of embodiments A1-A8.

D1. A target node configured for handover of a user equipment (UE) from a source cell served by a source node to a target cell served by the target node in a wireless network, the target node comprising:

communication interface circuitry configured to communicate with the UE and with the source node; and processing circuitry operably coupled with the communication interface circuitry, whereby the processing circuitry and the communication interface circuitry are configured to perform operations corresponding to any of the methods of embodiments B1-B11.

D2. A target node configured for handover of a user equipment (UE) from a source cell served by a source node to a target cell served by the target node in a wireless network, the target node being further configured to perform operations corresponding to any of the methods of embodiments B1-B11.

D3. A non-transitory, computer-readable medium storing program instructions that, when executed by processing circuitry of a target node configured for handover of a user equipment (UE) from a source cell served by a source node to a target cell served by the target node in a wireless network, configure the target node to perform operations corresponding to any of the methods of embodiments B1-B11.

D4. A computer program product comprising program instructions that, when executed by processing circuitry of a target node configured for handover of a user equipment (UE) from a source cell served by a source node to a target cell served by the target node in a wireless network, configure the target node to perform operations corresponding to any of the methods of embodiments B1-B11.

The invention claimed is:

1. A method performed by a source node for handover of a user equipment, UE, from a source cell served by the source node in a wireless network, the method comprising:

transmitting, in the source cell according to a reference time delivery configuration, one or more messages that include respective reference times in relation to corresponding source cell transmission events; and transmitting, to a target node in the wireless network, the reference time delivery configuration in relation to a request to handover the UE from the source cell to a target cell served by the target node, the reference time delivery configuration including one or more of the following:

signaling method used to deliver the messages;

delivery periodicity;

accuracy or uncertainty of the delivered reference times;

indication of whether propagation delay compensation is included in the delivered reference times; and configuration of propagation delay compensation.

2. The method of claim 1, wherein the accuracy or uncertainty is also included in the messages with the respective reference times.

3. The method of claim 2, wherein the delivery periodicity is one of an enumerated set of values that includes non-periodic or one-shot delivery.

4. The method of claim 3, wherein the configuration of propagation delay compensation includes one or more of the following: propagation delay compensation method, most recent propagation delay compensation, estimated propagation delay in the source cell, estimated distance between source node and UE, source node position, estimated UE speed, and update time for propagation delay compensation.

5. The method of claim 1, wherein the reference time delivery configuration is transmitted together with the request to handover the UE to the target cell.

6. The method of claim 1, wherein:

the reference time delivery configuration is transmitted before the request to handover the UE to the target cell; and the method further comprises receiving, from the target node, an indication of compliance with the reference time delivery configuration for the UE in the target cell.

7. The method of claim 6, further comprising:

transmitting the reference time delivery configuration to one or more further target nodes that serve respective further target cells prepared for handover of the UE from the source cell;

receiving, from the further target nodes, respective indications of compliance with the reference time delivery configuration for the UE in the respective further target cells; and selecting the target cell for handover of the UE from the source cell, based on the received indications of compliance with the reference time delivery configuration in the target cell and the further target cells.

8. A method performed by a target node for handover of a user equipment, UE, to a target cell served by the target node in a wireless network, the method comprising:

receiving, from a source node in the wireless network, a reference time delivery configuration used in a source cell to deliver messages, to the UE, that include respective reference times in relation to corresponding source cell transmission events, the reference time delivery configuration being received in relation to a request to handover the UE to the target cell, the received reference time delivery configuration used in the source cell including the following:

signaling method used to deliver the messages;

delivery periodicity;

accuracy or uncertainty of the reference times delivered by the source node;

indication of whether propagation delay compensation is included in the reference times delivered by the source node; and configuration of propagation delay compensation;

determining a reference time delivery configuration for the target cell based on the received reference time delivery configuration; and transmitting, in the target cell according to the determined reference time delivery configuration, one or more messages that include respective reference times in relation to corresponding target cell transmission events.

9. The method of claim 8, wherein the signaling method is one of broadcast signaling and unicast signaling.

10. The method of claim 9, wherein determining the reference time delivery configuration for the target cell comprises selecting the same signaling method for the target cell as used in the source cell.

11. The method of claim 9, wherein determining the reference time delivery configuration for the target cell comprises:

when unicast signaling is used in the source cell, selecting unicast signaling to deliver the messages to the UE in the target cell; and when broadcast signaling is used in the source cell, selecting either unicast signaling or broadcast signaling to deliver the messages to the UE in the target cell, based on one or more of the following:

parameters of the received reference time delivery configuration, other than the signaling method; and whether broadcast signaling is currently used for reference time delivery in the target cell.

12. The method of claim 9, wherein the accuracy or uncertainty is also included in the messages with the respective reference times.

13. The method of claim 12, wherein determining the reference time delivery configuration for the target cell comprises, when the accuracy or uncertainty is less than or equal to 200 ns, selecting one or more of the following based on a coverage area or radius of the target cell:

signaling method used to deliver the messages to the UE; and configuration of propagation delay compensation for the UE.

14. The method of claim 13, wherein the delivery periodicity is one of an enumerated set of values that includes non-periodic or one-shot delivery.

15. The method of claim 14, wherein the configuration of propagation delay compensation comprises one or more of the following: propagation delay compensation method, most recent propagation delay compensation, estimated propagation delay in the source cell, estimated distance between source node and UE, source node position, estimated UE speed, and update time for propagation delay compensation.

16. The method of claim 8, wherein the reference time delivery configuration is received together with the request to handover the UE to the target cell.

17. The method of claim 8, wherein:

the reference time delivery configuration is received before the request to handover the UE to the target cell; and the method further comprises:

determining compliance of the determined reference time delivery configuration with the received reference time delivery configuration; and transmitting, to the source node, an indication of compliance with the received reference time delivery configuration.

18. The method of claim 8, wherein the one or more messages are transmitted in the target cell after completion of the requested handover of the UE to the target cell.

19. A source node configured for handover of a user equipment, UE, from a source cell served by the source node in a wireless network, the source node comprising:

communication interface circuitry configured to communicate with the UE and with a target node in the wireless network; and processing circuitry operably coupled to the communication interface circuitry, whereby the processing circuitry and the communication interface circuitry are configured to:

transmit, in the source cell according to a reference time delivery configuration, one or more messages that include respective reference times in relation to corresponding source cell transmission events; and transmit, to the target node, the reference time delivery configuration in relation to a request to handover the UE from the source cell to a target cell served by the target node, the reference time delivery configuration including the following:

signaling method used to deliver the messages;

delivery periodicity;

accuracy or uncertainty of the delivered reference times;

indication of whether propagation delay compensation is included in the delivered reference times; and configuration of propagation delay compensation.

20. A target node configured for handover of a user equipment, UE, to a target cell served by the target node in a wireless network, the target node comprising:

communication interface circuitry configured to communicate with the UE and with a source node in the wireless network; and processing circuitry operably coupled with the communication interface circuitry, whereby the processing circuitry and the communication interface circuitry are configured to:

receive, from the source node, a reference time delivery configuration used in a source cell to deliver messages, to the UE, that include respective reference times in relation to corresponding source cell transmission events, the reference time delivery configuration being received in relation to a request to handover the UE to the target cell, the received reference time delivery configuration used in the source cell including the following:

signaling method used to deliver the messages;

delivery periodicity;

accuracy or uncertainty of the reference times delivered by the source node;

indication of whether propagation delay compensation is included in the reference times delivered by the source node; and configuration of propagation delay compensation;

determine a reference time delivery configuration for the target cell based on the received reference time delivery configuration; and transmit, in the target cell according to the determined reference time delivery configuration, one or more messages that include respective reference times in relation to corresponding target cell transmission events.

* * * * *